United States Patent
Xu et al.

(10) Patent No.: US 9,336,579 B2
(45) Date of Patent: May 10, 2016

(54) SYSTEM AND METHOD OF PERFORMING MULTI-LEVEL INTEGRATION

(71) Applicant: QUALCOMM Incorporated, San Diego, CA (US)

(72) Inventors: Qinwen Xu, San Diego, CA (US); Bo Zhou, San Diego, CA (US); Shuxue Quan, San Diego, CA (US); Junchen Du, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 201 days.

(21) Appl. No.: 14/201,636

(22) Filed: Mar. 7, 2014

(65) Prior Publication Data

US 2015/0254824 A1 Sep. 10, 2015

(51) Int. Cl.
*G06K 9/40* (2006.01)
*G06T 5/10* (2006.01)

(52) U.S. Cl.
CPC .......... *G06T 5/10* (2013.01); *G06T 2207/20024* (2013.01); *G06T 2207/20212* (2013.01)

(58) Field of Classification Search
CPC .......... H03H 17/0286; H03H 17/0671; H03H 17/0685; H03L 7/146; H03L 7/148; H03L 7/81; H03M 3/392; H03M 3/414; H04N 5/332; H04N 5/351; H04N 5/3535; H04N 5/378; G06T 1/20; G06T 5/10; G01S 17/89; G06F 1/04; G06F 17/141; G06J 1/005
See application file for complete search history.

(56) References Cited

U.S. PATENT DOCUMENTS

| | | | |
|---|---|---|---|
| 7,302,459 B2 * | 11/2007 | Bossmeyer | ........ H03H 17/0286 708/313 |
| 8,421,660 B1 * | 4/2013 | Wan | ...................... H03M 3/392 341/118 |
| 8,532,243 B2 * | 9/2013 | Seethamraju | .............. G06F 1/04 327/156 |
| 8,558,286 B2 | 10/2013 | Tian et al. | |
| 2012/0327141 A1 | 12/2012 | Yoshida | |
| 2013/0169618 A1 | 7/2013 | Kobayashi et al. | |
| 2013/0187028 A1 | 7/2013 | Salvestrini et al. | |
| 2013/0229521 A1 | 9/2013 | Siecke et al. | |

* cited by examiner

*Primary Examiner* — Jose Couso
(74) *Attorney, Agent, or Firm* — Toler Law Group, PC

(57) ABSTRACT

A particular method includes generating a first result of a first integration operation performed on a first subset of elements of the plurality of elements. The first integration operation is associated with a first level of integration. The method includes generating a second result of a second integration operation performed on the first subset of elements. The second integration operation is associated with a second level of integration. The method further includes performing a third integration operation on a second subset of elements of the plurality of elements. The third integration operation is associated with the second level of integration. The third integration operation is performed based on the first result and the second result.

20 Claims, 10 Drawing Sheets

SYSTEM AND METHOD OF PERFORMING MULTI-LEVEL INTEGRATION

I. FIELD

The present disclosure is generally related to performing multi-level integration.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Integrators are used in filters by electronic devices (e.g., wireless telephones), such as for executing computer vision applications or image processing applications. One example of a filter that uses integrators is a cascaded integrator-comb (CIC) filter. A CIC filter may be used in multi-scale image processing or blurring image processing as a substitute for a large-tap low-pass finite impulse response (FIR) filter. The CIC filter includes multiple integrator stages that generate integral images by performing multi-level integration on an input image. The integrator stages are followed by comb filters that filter the integral images.

Performing multi-level integration on an input image using the CIC filter involves significant computation time and resources. For example, consider a 2-level integration operation on an input image containing two pixels. Performing a first level of integration of the 2-level integration operation includes generating a first result based on a first pixel value and generating a second result by adding the first result and a second pixel value. Similarly, performing a second level of integration of the 2-level integration operation includes generating a third result based on the first result and generating a fourth result by adding the third result and the second result. As can be appreciated from the above example, performing a higher level of integration includes using, for each pixel, an intermediate result from a lower level of integration. Further, at each level of integration, results are computed sequentially due to data dependency.

Due to the data dependency, multi-level integration is difficult to perform using vectorized or parallel processing. Additionally, performing multi-level integration involves performing a large number of operations. For example, to perform three levels of integration on an input image having N elements (e.g., pixels), the CIC filter performs 3N operations (e.g., N operations per level of integration). Performing such a large number (e.g., O(n)) of operations incurs significant costs in terms of processing time and memory used to store results of the operations.

III. SUMMARY

The disclosed system and method describe performing multi-level integration to generate multiple results in parallel (as opposed to sequentially) and uses a reduced number of operations. A multi-level integration operation may be performed on an input image on a subset-by-subset basis instead of on the input image as a whole. For example, consider a 2-level integration operation performed on an input image containing six pixels that are subdivided into subsets of three pixels. During integration of a particular subset, results for the three pixels in the subset may be generated in parallel instead of sequentially. Further, at each level of integration, a single intermediate result may be generated for each subset as opposed to generating an intermediate result for each pixel.

To facilitate reduced data dependencies and parallel processing, integration coefficients may be pre-computed and stored in a memory accessible to a multi-level integrator. In addition, a multi-vector multiplication instruction disclosed herein may be used to perform the multi-level integration on a vector processor. The multi-vector multiplication instruction may be used to multiply each element of a subset of elements by corresponding coefficients from a plurality of coefficients. In the above-described example, a single multi-vector multiplication instruction may be used to multiply a first pixel (e.g., pixel value) of a subset by a first coefficient, a second pixel of the subset by a second coefficient, and a third pixel of the subset by a third coefficient as part of a single vector operation.

In a particular embodiment, a method of performing a multi-level integration operation on a plurality of elements at a processor includes generating a first result of a first integration operation performed on a first subset of elements of the plurality of elements. The first integration operation is associated with a first level of integration. The method includes generating a second result of a second integration operation performed on the first subset of elements. The second integration operation is associated with a second level of integration. The method further includes performing a third integration operation on a second subset of elements of the plurality of elements. The third integration operation is associated with the second level of integration. The third integration operation is performed based on the first result and the second result. In a particular embodiment, a result may also be generated for the second subset of elements at the first level of integration. Multiple results are generated in parallel. For example, a first subset of results of the second integration operation is generated in parallel and a second subset of results of the third integration operation is generated in parallel.

In another particular embodiment, an apparatus includes a multi-level integrator configured to generate an integral image based on an input image. The multi-level integrator is configured to perform a first level of integration and a second level of integration. Generating the integral image includes performing a first integration operation on a first subset of pixels of the input image. The first integration operation is associated with the second level of integration. The first integration operation is performed based on a first result of a second integration operation and a second result of a third integration operation. A first subset of results of the first integration operation is generated in parallel and a second subset of results of the third integration operation is generated in parallel. The apparatus further includes a plurality of comb filters coupled to the multi-level integrator. The plurality of comb filters is configured to output a plurality of Gaussian images based on the integral image.

In another particular embodiment, a method includes receiving a multi-vector instruction at a processor. The multi-vector multiplication instruction indicates a first register and a second register. The method includes executing, via the processor, the multi-vector multiplication instruction. Executing the multi-vector multiplication instruction causes the processor to generate a first result by multiplying a first element in the first register by a second element in the second register. Executing the multi-vector multiplication instruction also causes the processor to generate a second result by multiplying a third element in the first register by a fourth element in the second register. Execution of the multi-vector multiplication instruction may be performed during multi-level integration of an input to multiply a subset of elements of the input by a plurality of coefficients.

One particular advantage provided by at least one of the disclosed embodiments is generating multiple results of multi-level integration for a particular subset of elements in parallel instead of sequentially. Generating multiple results in parallel enables the multi-level integration operation to be performed using a vector processor, which increases processing speed as compared to conventional multi-level integration. Another advantage is that, at each intermediate level of integration, a single intermediate result may be generated for each subset as opposed to generating an intermediate result for each pixel in the subset.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 10:
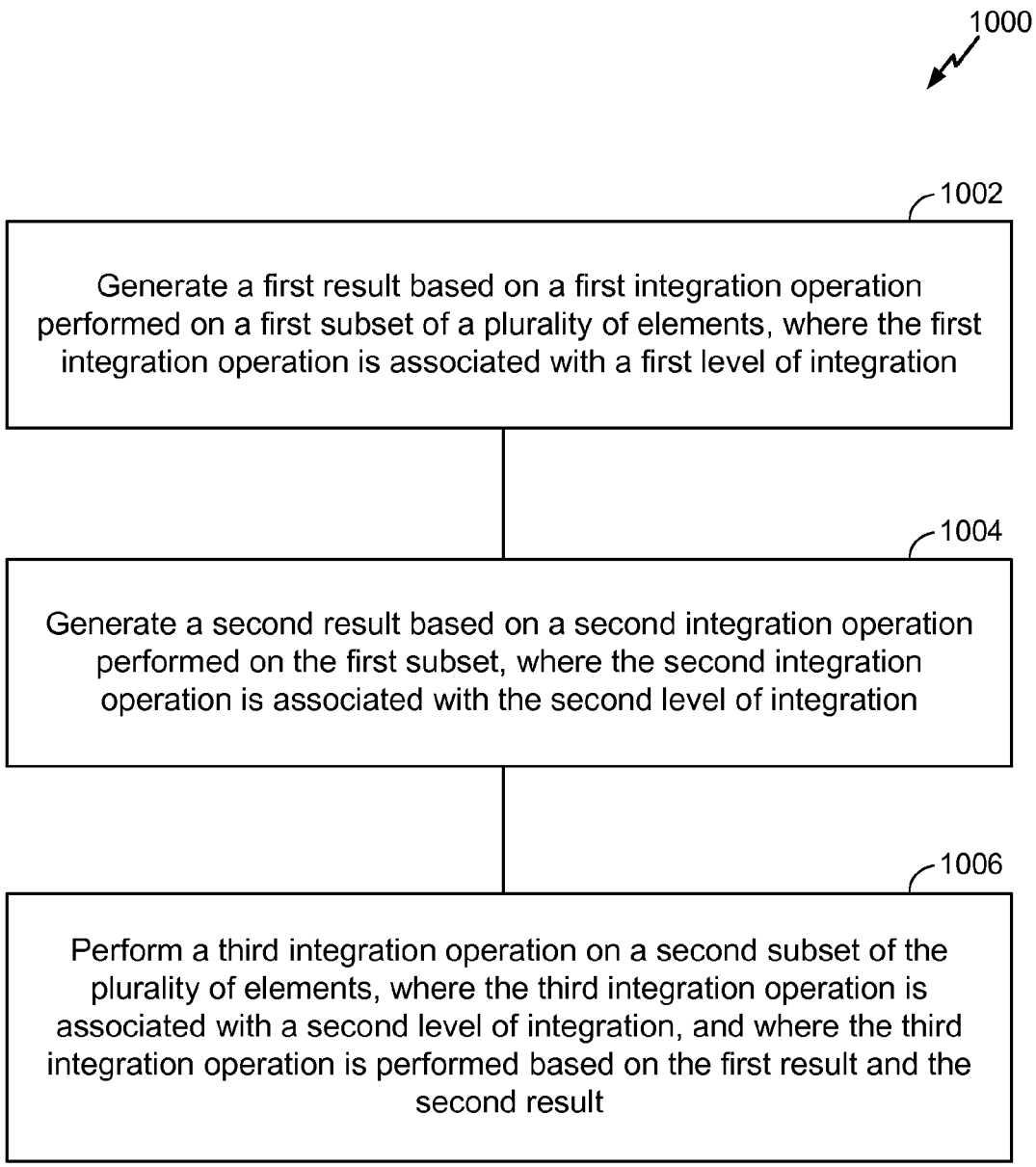
Figure 11:
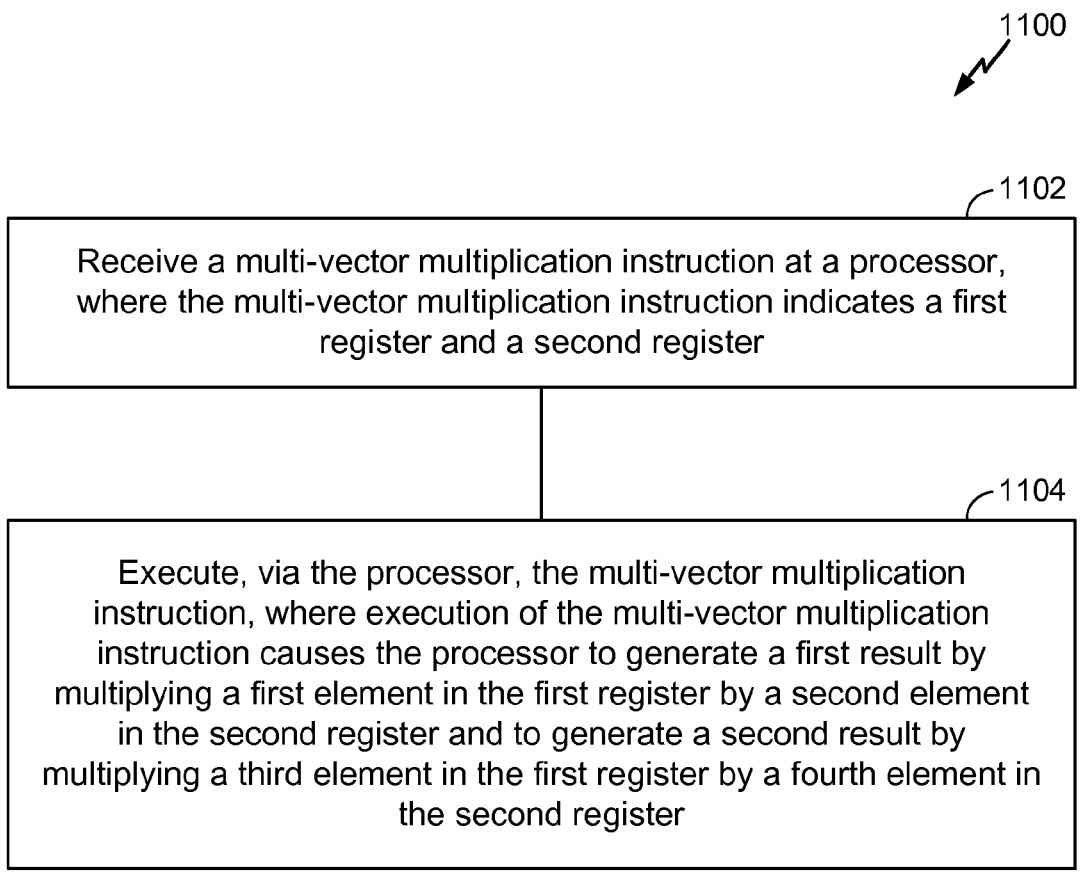
Figure 12:
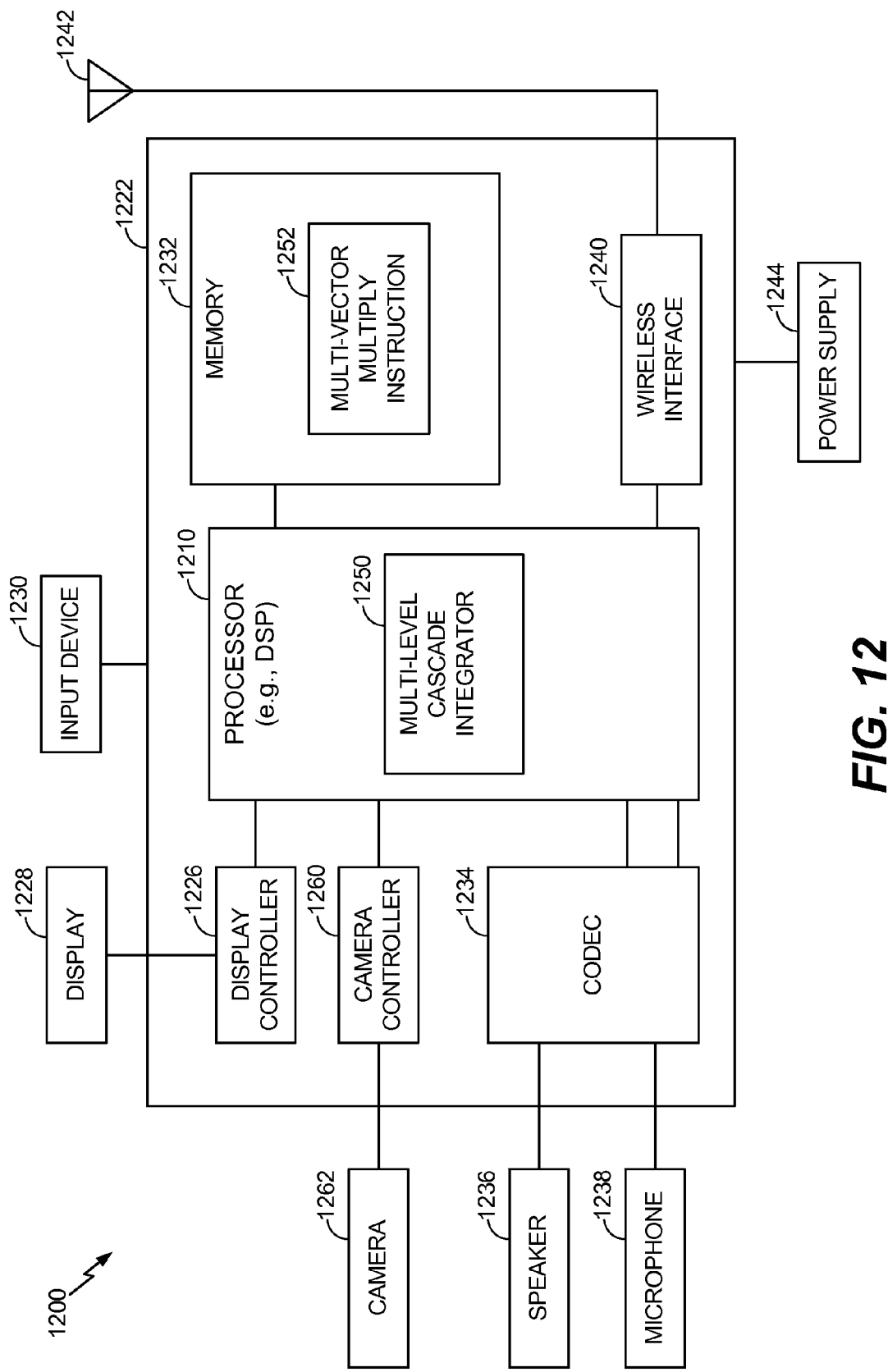

FIGS. 5, 6, 7, 8, and 9 illustrate a particular embodiment of performing a multi-level integration operation at a vector processor;

FIG. 10 is a flow chart of a particular embodiment of a method of performing a multi-level integration operation;

FIG. 11 is a flow chart of a particular embodiment of a method of executing a multi-vector multiplication instruction; and FIG. 12 is a block diagram of a communication device including a multi-level integrator.

V. DETAILED DESCRIPTION

Particular embodiments of the present disclosure are described below with reference to the drawings. In the description, common features are designated by common reference numbers throughout the drawings.

Described herein are embodiments of a multi-level integrator that generates multiple results of multi-level integration in parallel (as opposed to sequentially). The multi-level integrator may perform integration on an input image on a subset-by-subset basis, and multiple results corresponding to a particular subset of the input image may be generated in parallel. The multi-level integrator may, at each intermediate level of integration, generate a single intermediate result for each subset of the input image as opposed to an intermediate result for each pixel of the input image. The multi-level integrator may also pre-generate and store integration coefficients in a memory for use in performing multi-level integration on each subset of the input image. Because multiple results of the multi-level integration are generated in parallel, the multi-level integration may be vectorized using a vector processor, thereby increasing processing speed and efficiency as compared to conventional multi-level integration.

Figure 1:
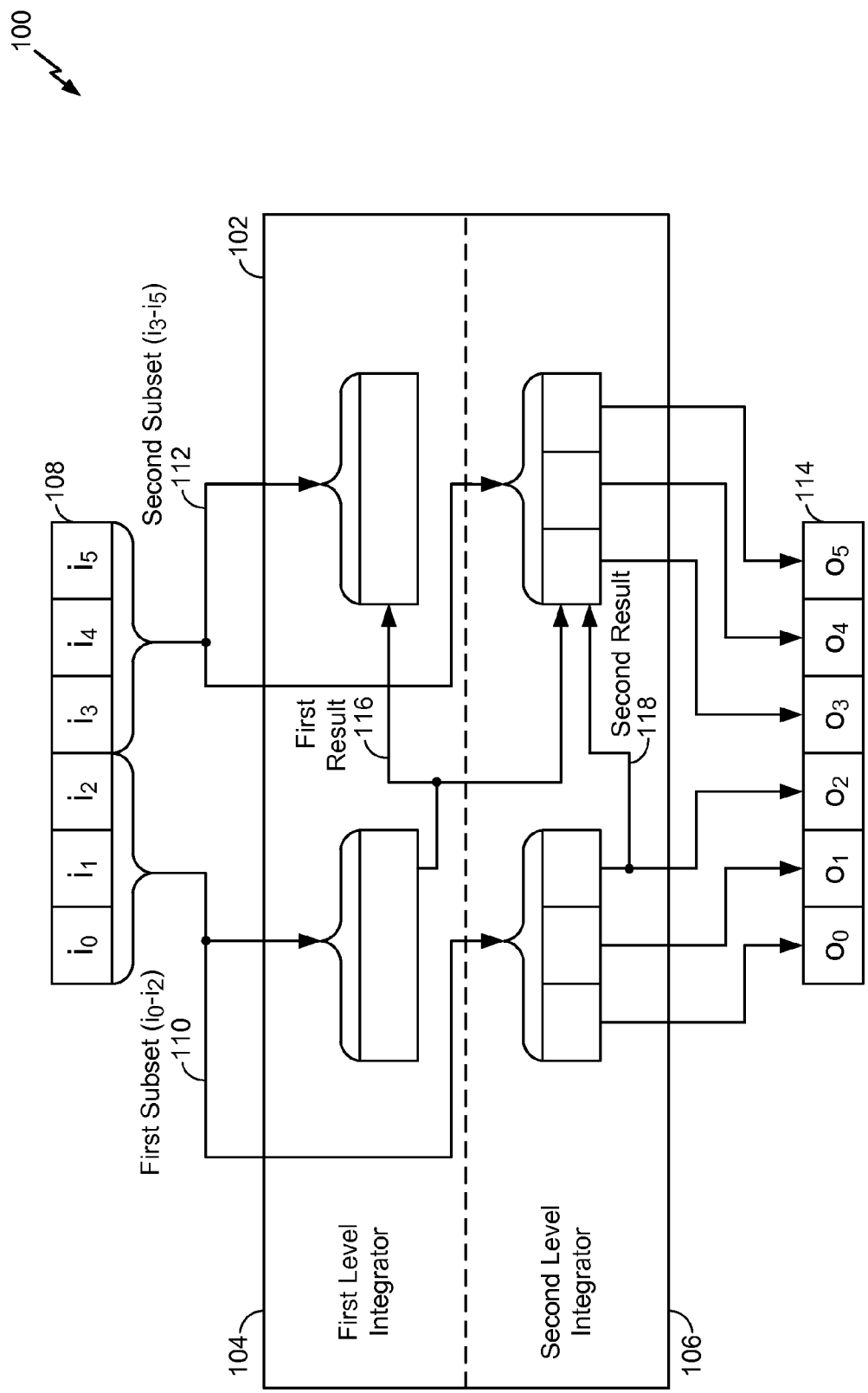
FIG. 1 is a diagram of a particular embodiment of a system to perform a two-level integration operation.

Referring to FIG. 1, a particular embodiment of a system to perform a 2-level integration operation is depicted and generally designated 100. In the example of FIG. 1, an input 108 contains six elements $i_0$-$i_5$. The 2-level integration operation is performed on the input 108 to generate an output 114 (e.g., a plurality of output elements). For example, in FIG. 1 the output 114 includes six results $o_0$-$o_5$ that each correspond to one of the elements $i_0$-$i_5$ of the input 108 (e.g., the input 108 and the output 114 have the same number of elements). In a particular embodiment, the input 108 is an input image (or a portion thereof) containing six pixel values, and the output 114 is an integral image (or a portion thereof) containing corresponding integral values for each of the pixel values in the input image 108.

The output 114 may be generated by a multi-level integrator 102 configured to perform the 2-level integration operation. In the example illustrated in FIG. 1, the 2-level integration operation includes a first level of integration and a second level of integration. The multi-level integrator 102 may include a first level integrator 104 configured to perform the first level of integration and a second level integrator 106 configured to perform the second level of integration. In other embodiments, a multi-level integration operation may include more than two levels of integration, and the multi-level integrator 102 may include more than two integrators.

In a particular embodiment, the multi-level integrator 102 may be included in or may be part of a processor that is configured to execute one or more instructions to perform the 2-level integration operation. In another embodiment, the multi-level integrator 102 may be a discrete hardware component configured to perform the 2-level integration operation. For example, the multi-level integrator 102 may include digital logic (e.g., adders, multipliers, logic gates, or a combination thereof) configured to perform the 2-level integration operation.

As illustrated in FIG. 1, the output 114 may be generated by the second level integrator 106. The level of integration associated with the output 114 is referred to as a "highest" level of integration of the multi-level integrator 102. Levels of integration other than the "highest" level of integration are referred to as "intermediate" levels of integration. For example, in FIG. 1 the first level of integration is an intermediate level and the second level of integration is the highest level.

First level integration is performed on a particular element by summing a plurality of elements that span a "range" from an initial element to the particular element. For example, a first level integration operation $Y_1(m)$ may be performed as defined by the following equation, where $X(i)$ is an element of the plurality of elements being integrated:

$$Y_1(m)=\Sigma_{i=0}^{m}x(i) \quad \text{Equation (1)}$$

As an illustrative example, in FIG. 1, $Y_1(2)=i_0+i_1+i_2$. Thus, for a particular element of the input 108, a first level integration result corresponding to the particular element is the sum of the particular element and each preceding element.

Each level of integration is based on results of a "lower" level of integration. For example, the second level of integration is based on results of the first level of integration. For a multiple level integration operation, an output after K levels of integration may be expressed using the following equation:

$$Y_k(m)=\Sigma_{i=0}^{m}Y_{k-1}(i) \quad \text{Equation (2)}$$

As illustrative examples, in FIG. 1, $Y_2(1)=Y_1(0)+Y_1(1)=(i_0)+(i_0+i_1)$ and $Y_2(2)=Y_1(0)+Y_1(1)+Y_1(2)=(i_0)+(i_0+i_1)+(i_0+i_1+i_2)$. $Y_2(2)$ can thus be rewritten as $Y_2(2)=Y_2(1)+Y_1(2)$. Because the second level integration $Y_2(2)$ depends on the result of $Y_2(1)$ (e.g., a preceding second level integration result), the second level integration operation has a data dependency on preceding elements. Due to the data dependency, conventional multi-level integration involves sequentially generating each result of a particular level of integration.

To decrease processing time and increase parallelism, the multi-level integrator 102 processes the input 108 on a subset-by-subset basis (e.g., by subsets of elements) instead of as a whole. Because each subset of elements is independently processed, results corresponding to a particular subset of elements may be generated in parallel. For example, the input 108 may be processed as multiple subsets of elements each having $\Delta$ elements. Equation 2 may be rewritten as the following equation, where n is a multiple of $\Delta$:

$$Y_k(m)=Y_k(n)+\Sigma_{i=n+1}^{m}Y_{k-1}(i) \quad \text{Equation (3)}$$

Equation 3 illustrates that a result corresponding to a particular element m of a particular subset (e.g., n+1 to n+$\Delta$) may be generated based on the particular subset (e.g., the summation operation in Equation 3) and at least one previous result (e.g., $Y_k(n)$, which is a result associated with a previous subset of elements n−$\Delta$ to n). Equation 3 can be further rewritten as the following equation:

$$Y_k(m)=Y_k(n)+(m-n)Y_{k-1}(n)+\Sigma_{i=n+1}^{m}\Sigma_{j=n+1}^{i}Y_{k-2}(j) \quad \text{Equation (4)}$$

In Equation 4, $Y_k(n)$ represents a previous highest level result, $Y_{k-1}(n)$ represents a previous intermediate result, and the summation operation represents a summation of the particular subset of elements (e.g., $Y_0(j)=X(j)$). Thus, one or more results associated with a particular subset of elements are generated based on a set of previous results (e.g., a previous highest level result and one or more previous intermediate results) associated with a previous subset of elements and the second subset of elements 112.

In FIG. 1, the input 108 may be subdivided into a first subset of elements 110 and a second subset of elements 112. Each of the subsets of elements contains three elements (e.g., the first subset of elements 110 contains elements $i_0$-$i_2$ and the second subset of elements 112 contains elements $i_3$-$i_5$). Although illustrated in FIG. 1 as being subdivided into two subsets each containing three elements, the illustration is not limiting. The input 108 may be subdivided into any number of subsets containing any number of elements. The number of elements in a subset and the number of subsets may be selected based on properties of the multi-level integrator 102 (e.g., properties of a processor, such as register size, instruction width, processing capabilities, etc.). The multi-level integrator 102 may receive the first subset of elements 110 and the second subset of elements 112 and perform the 2-level integration operation to generate the output 114 (e.g., the plurality of results $o_0$-$o_5$).

Performing the 2-level integration operation may include generating a first result 116 of a first integration operation performed on the first subset of elements 110. The first result 116 may be associated with a last sequential element of the first subset of elements 110. For example, the first result 116 may correspond to $Y_1(2)$.

Performing the first integration operation may generate a single result (e.g., the first result 116) instead of generating $\Delta$ results (e.g., three results). Generating a number of results that is less than $\Delta$ is referred to herein as generating results at a "downsampled" rate. Thus, the multi-level integrator 102 generates results of each intermediate level of integration at a downsampled rate of 1/$\Delta$ (e.g., one intermediate result is generated for every $\Delta$ elements of the input 108). In FIG. 1, the multi-level integrator 102 generates results of the first level of integration at a rate of ⅓ (e.g., one result of the intermediate level of integration is generated for every three elements of the input 108).

Performing the 2-level integration operation may include generating a first subset of results of a second integration operation performed on the first subset of elements 110. For example, the second level integrator 106 may perform the second integration operation on the first subset of elements 110 to generate a first subset of results $o_0$-$o_2$ of the output 114. For each element $i_0$, $i_1$, and $i_2$ of the first subset of elements 110, the second level integrator 106 may generate a corresponding result $o_0$, $o_1$, and $o_2$.

The first subset of results may include a second result 118. The second result 118 may be associated with the last sequential element of the first subset of elements 110. For example, the second result 118 may be $o_2$ (e.g., the second result 118 may correspond to $Y_2(2)$).

Performing the 2-level integration operation includes generating results of a third integration operation performed on the second subset of elements 112. For example, the second level integrator 106 may perform the third integration operation on the second subset of elements 112 to generate a second subset of results $o_3$-$o_5$ of the output 114. For example, for each element $i_3$, $i_4$, and $i_5$ of the second subset of elements 112, the second level integrator 106 may generate a corresponding result $o_3$, $o_4$, and $o_5$. Each of the results $o_3$-$o_5$ may be generated based on the elements $i_3$-$i_5$ of the second subset of elements 112, the first result 116, and the second result 118. For example, as per Equation 4, $o_3$ may be a sum of the second result 118 (e.g., $Y_2(2)$), the first result 116 (e.g., $Y_1(2)$), and $i_4$. Each of $o_4$ and $o_5$ may be similarly computed using Equation 4 based on the first result 116, the second result 118, and elements $i_3$-$i_5$ of the second subset of elements 112.

Because the multi-level integrator 102 processes the input 108 subset-by-subset instead of as a whole, certain results may be generated in parallel. For example, $o_0$, $o_1$, and $o_2$ may be generated in parallel (e.g., concurrently) via three parallel operations each based on at least one of $i_0$-$i_2$. Similarly, $o_3$, $o_4$, and $o_5$ may be generated in parallel (e.g., concurrently) via three parallel operations each based on the first result 116, the second result 118, and at least one of $i_3$-$i_5$. Generating multiple results in parallel for a particular subset of elements enables the multi-level integrator 102 to perform the multi-level integration operation using vectorized processing. For example, each subset of elements may be stored in a corresponding vector register, and each subset of results may be generated by executing one or more vector processing instructions at a vector processor.

In a particular embodiment, intermediate results of a "last" subset of elements of the input 108 may not be used. In the embodiment illustrated in FIG. 1, the second subset of elements 112 is the last subset of elements, and intermediate results (e.g., a first level of integration result) of the second subset of elements 112 may not be generated and/or used. In another embodiment, the input 108 may be subdivided into more than two subsets. In this embodiment, processing the input 108 may include additional steps. For example, the first level integrator may perform a fourth integration operation of the second subset of elements 112 to generate a third result (e.g., an intermediate result associated with the second subset of elements 112). An additional subset of elements (not shown) may be processed based on the third result and a fourth result (e.g., $o_5$) in a similar manner to processing the second subset of elements 112 based on the second subset of elements 112, the first result 116, and the second result 118. An intermediate result may not be generated for a "last" of the additional subset(s) of elements. An example of processing three subsets of elements is further described with reference to FIG. 2. Thus, the input 108 may be processed as any number of subsets, and performing the 2-level integration operation may include generating a single result of the first level integration 104 for each subset of elements (e.g., the first result 116 and the third result).

By performing the 2-level integration operation using vectorized processing, the multi-level integrator 102 achieves faster performance as compared to conventional multi-level integration. For example, multiple results for a particular subset of elements may be generated in parallel using a single vector operation. Additionally, the multi-level integrator 102 generates results of intermediate levels of integration at a downsampled rate of $1/\Delta$ instead of generating N results (e.g., an intermediate result corresponding to each element of the input 108). Thus, the multi-level integrator 102 performs fewer operations and uses less memory for storing results of intermediate levels of integration as compared to conventional multi-level integration. The multi-level integrator 102 may provide additional speed improvements through use of cascaded parallelism, as further described with reference to FIG. 2.

Figure 2:
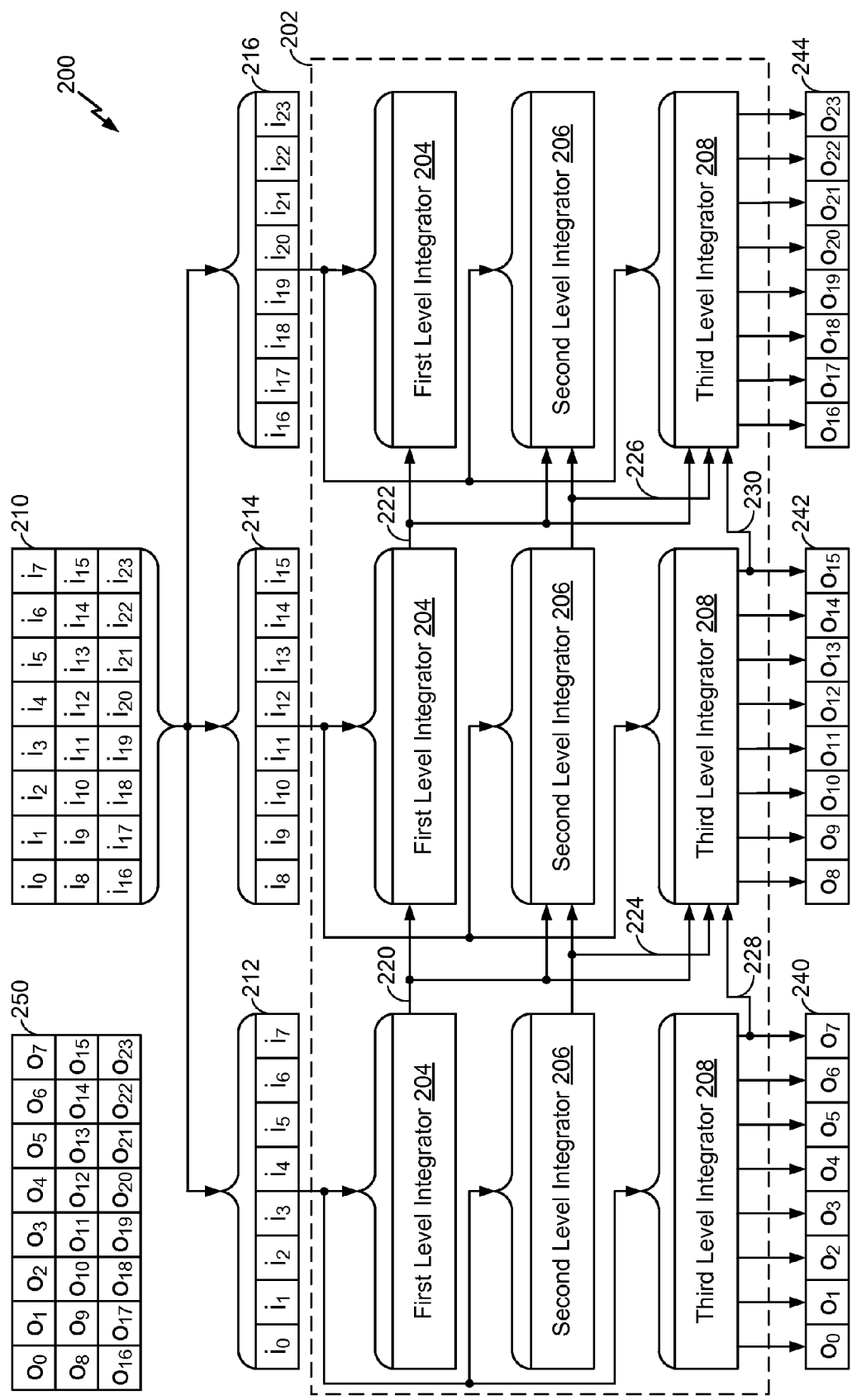
FIG. 2 is a diagram of a particular embodiment of a system to perform a three-level integration operation.

Referring to FIG. 2, a particular embodiment of a system to perform a 3-level integration operation is depicted and generally designated 200. The 3-level integration operation differs from the 2-level integration operation of FIG. 1 by including three levels of integration. In FIG. 2, an input 210 includes twenty four elements $i_0$-$i_{23}$. The 3-level integration operation may be performed on the input 210 and may generate an output 250 including a first subset of results 240, a second subset of results 242, and a third subset of results 244. The input 210 and the output 250 have the same number of elements. For example, in FIG. 2, the output 250 includes twenty four results $o_0$-$o_{23}$ that each correspond to one of the elements $i_0$-$i_{23}$ of the input 210. In a particular embodiment, the input 210 is an input image (or a portion thereof) containing twenty-four pixels across three rows, and the output 250 is an integral image (or a portion thereof) containing corresponding integral values for each of the pixels in the input image.

The output 250 (e.g., the integral image) may be generated by a multi-level integrator 202. The multi-level integrator 202 includes first level integrator(s) 204 configured to perform a first level of integration, second level integrator(s) 206 configured to perform a second level of integration, and third level integrator(s) 208 configured to perform a third level of integration. In other embodiments, the 3-level integration operation may include more than three levels of integration, and the multi-level integrator 202 may include additional integrators.

In a particular embodiment, the multi-level integrator 202 may be included in or part of a processor that is configured to execute one or more instructions to perform the 3-level integration operation. In another embodiment, the multi-level integrator 202 may be a discrete hardware component configured to perform the 3-level integration operation. For example, the multi-level integrator 202 may include digital logic (e.g., adders, multipliers, logic gates, or a combination thereof) configured to perform the 3-level integration operation.

As illustrated in FIG. 2, the output 250 may be generated by the third level integrator(s) 208. Thus, in FIG. 2, the first level of integration and the second level of integration are "intermediate" levels and the third level of integration is the "highest" level.

The multi-level integrator 202 may perform the 3-level integration operation on the input 210 on a subset-by-subset basis. In FIG. 2, the input 210 is subdivided into a first subset of elements 212, a second subset of elements 214, and a third subset of elements 216. In a particular embodiment, each subset of elements represents a row of pixels of an input image. In other embodiments, the subsets of elements may be selected using other methods. Each of the subsets contains eight elements (e.g., the first subset of elements 212 contains elements $i_0$-$i_7$, the second subset of elements 214 contains elements $i_8$-$i_{15}$, and the third subset of elements 216 contains elements $i_{16}$-$i_{23}$). In alternate embodiments, the input 210 may be subdivided into a different number of subsets containing a different number of elements. The number of elements in a subset and the number of subsets may be selected based on properties of the multi-level integrator 202 (e.g., properties of a processor, such as register size, instruction width, processing capabilities, etc.). The multi-level integrator 202 may receive the first subset of elements 212, the second subset of elements 214, and the third subset of elements 216, and may perform the 3-level integration operation to generate the output 250 (e.g., the first subset of results 240, the second subset of results 242, and the third subset of results 244).

Performing the 3-level integration operation may include generating a first result 220 of a first-level integration operation performed on the first subset of elements 212. The first result 220 may be associated with a last sequential element (e.g., $Y_1(7)$) of the first subset of elements 212.

Performing the 3-level integration operation may also include generating a second result 224 of a second-level integration operation performed on the first subset of elements 212. The second result 224 may be associated with a last sequential element (e.g., $Y_2(7)$) of the first subset of elements 212.

Performing the 3-level integration operation may further include generating the first subset of results 240 of a third-level integration operation performed on the first subset of elements 212. The first subset of results 240 may include a third result 228 that is generated based on the first subset of elements 212. The third result 228 may be associated with the last sequential element (e.g., $Y_3(7)$) of the first subset of elements 212.

The second subset of elements 214 and the third subset of elements 216 may be processed similarly to the first subset of elements 212, but may include using intermediate results from processing of previous subsets of elements. For example, a second first-level integration operation, a second second-level integration operation, and a second third-level integration operation may be performed on the second subset of elements 214. The first level integrator(s) 204 may perform the second first-level integration operation based on the first result 220 (from processing the first subset of elements 212) to generate a fourth result 222. The second level integrator(s) 206 may perform the second second-level integration operation based on the first result 220 and the second result 224 (from processing the first subset of elements 212) to generate a fifth result 226. The third level integrator(s) 208 may perform the second third-level integration operation based on the first result 220, the second result 224, and the third result 228 (from processing the first subset of elements 212) to generate the second subset of results 242, including a sixth result 230 (e.g., $o_{15}$).

The third subset of elements 216 may be processed similarly to the first subset of elements 212 and the second subset of elements 214, but may include using intermediate results from processing of previous subsets of elements. For example, the third level integrator(s) 208 may perform a third third-level integration operation on the third subset of elements 216 to generate the third subset of results 244. The third third-level integration operation may be based on results from processing the second subset of elements 214 (the fourth result 222, the fifth result 226, and the sixth result 230). If the input 210 includes more than three subsets of elements, additional integration operations (e.g., additional first-level and second level integration operations) may be performed on the third subset of elements 216 to generate additional intermediate results that may be used to process an additional subset of elements.

Each of the first-level integration operations and the second-level integration operations may generate a single intermediate result (e.g., the first result 220, the second result 224, the fourth result 222, or the fifth result 226, respectively) instead of generating 4 intermediate results (e.g., eight results). Thus, the multi-level integrator 202 generates results of each intermediate level of integration (e.g., the first level of integration and the second level of integration) at a downsampled rate of 1/Δ. In FIG. 2, the multi-level integrator 202 generates results of the first level of integration and the second level of integration at a downsampled rate of ⅛ (e.g., one result of each intermediate level of integration is generated for every eight elements of the input 210).

Because the multi-level integrator 202 processes the input 210 on a subset-by-subset basis instead of as a whole, each result of a particular subset of results may be generated in parallel. For example, each of $o_0$-$o_7$ may be generated in parallel (e.g., concurrently) using eight parallel operations each based on at least one of $i_0$-$i_7$. Similarly, each of $o_8$-$o_{15}$ may be generated in parallel using eight parallel operations each based on the first result 220, the second result 224, the third result 228, and at least one of $i_8$-$i_{15}$. Results $o_{16}$-$o_{23}$ may be similarly generated. Generating multiple results in parallel for a particular subset of elements enables each subset of elements to be processed as a vector using vectorized processing.

The multi-level integrator 202 also may take advantage of cascaded parallelism in performing the 3-level integration operation. Cascaded parallelism refers to starting processing of a portion of a next subset of elements before processing of a previous subset of elements is complete. For example, the second first-level integration operation performed on the second subset of elements 214 uses the first result 220 (from processing the first subset of elements 212), but does not use the second result 224 or the third result 228. Thus, the second first-level integration operation may be initiated (e.g., started) after the first first-level integration operation is completed (e.g., after the first result 220 is generated), but prior to completion of the first second-level integration operation or the first third-level integration operation (e.g., prior to generation of the second result 224 or the third result 228). As another example, the second second-level integration operation may be initiated after the first result 220 and the second result 224 are generated, but prior to generation of the third result 228. Additional subsets may be similarly processed using cascaded parallelism.

Performing the 3-level integration operation includes performing an independent computation to generate each result. As explained above, Equation 4 illustrates a kth level integration operation. Based on Equation 4, a third level integration operation may be represented using the following equation, where a, b, and $c_i$ are constant coefficients:

$$Y_3(n+m)=Y_3(n)+a*Y_2(n)+b*Y_1(n)+\Sigma_{i=1}^{m}c_i*X(n+i) \quad \text{Equation (5)}$$

$Y_1(n)$ represents a first level integration result (e.g., the first result 220 or the fourth result 222), $Y_2(n)$ represents a second level integration result (e.g., the second result 224 or the fifth result 226), $Y_3(n)$ represents a third level integration result (e.g., the third result 228 or the sixth result 230), and the summation operation represents a summation of elements of a particular subset (e.g., the subsets of elements 212-216). Based on Equation 5, performing a third-level integration operation on a particular element of a particular subset of elements may include multiplying one or more of the elements by a corresponding integration coefficient (e.g., the coefficient a, the coefficient b, or one of the plurality of coefficients c) associated with the particular element. Performing the third-level integration operation further includes generating a sum of results of the multiplication operations.

The values of the coefficients a, b, and c are different for each element of the subset of elements (e.g., for each value of m from 1 to Δ). Table 1 includes a plurality of equations used to compute a first level integration operation result, a second level integration operation result, and third level integration operation result corresponding to each of a plurality of elements in a particular subset. In the illustrated example, each subset of elements includes sixteen elements (e.g., Δ=16), and the entries in Table 1 are associated with computing results corresponding to a particular subset of elements X(16)-X(31). $Y_1(15)$, $Y_2(15)$, and $Y_3(15)$ correspond to a set of previous results associated with a preceding subset (e.g., X(0)-X(15)). Each entry of Table 1 includes an equation for determining a result of a particular level of integration ($Y_1$, $Y_2$, or $Y_3$) corresponding to a particular element X(16)-X(31).

TABLE 1

| index | 16 | 17 | 18 | 19 |
|---|---|---|---|---|
| $Y_1$ | $Y_1(15)$ + x(16) | $Y_1(15)$ + x(16) + x(17) | $Y_1(15)$ + x(16) + x(17) + x(18) | $Y_1(15)$ + x(16) + x(17) + x(18) + x(19) |
| $Y_2$ | $Y_2(15)$ + $Y_1(15)$ + x(16) | $Y_2(15)$ + $2Y_1(15)$ + 2x(16) + x(17) | $Y_2(15)$ + $3Y_1(15)$ + 3x(16) + 2x(17) + x(18) | $Y_2(15)$ + $4Y_1(15)$ + 4x(16) + 3x(17) + 2x(18) + x(19) |
| $Y_3$ | $Y_3(15)$ + $Y_2(15)$ + $Y_1(15)$ + x(16) | $Y_3(15)$ + $2Y_2(15)$ + $3Y_1(15)$ + 3x(16) + x(17) | $Y_3(15)$ + $3Y_2(15)$ + $3Y_1(15)$ + 6x(16) + 3x(17) + x(18) | $Y_3(15)$ + $4Y_2(15)$ + $10Y_1(15)$ + 10x(16) + 6x(17) + 3x(18) + x(19) |

TABLE 1-continued

| index | 20 | 21 | 22 | 23 |
|---|---|---|---|---|
| $Y_1$ | $Y_1(15) + x(16) + x(17) + x(18) + x(19) + x(20)$ | $Y_1(15) + x(16) + x(17) + x(18) + x(19) + x(20) + x(21)$ | $Y_1(15) + x(16) + x(17) + x(18) + x(19) + x(20) + x(21) + x(22)$ | $Y_1(15) + x(16) + x(17) + x(18) + x(19) + x(20) + x(21) + x(22) + x(23)$ |
| $Y_2$ | $Y_2(15) + 5Y_1(15) + 5x(16) + 4x(17) + 3x(18) + 2x(19) + x(20)$ | $Y_2(15) + 6Y_1(15) + 6x(16) + 5x(17) + 4x(18) + 3x(19) + 2x(20) + x(21)$ | $Y_2(15) + 7Y_1(15) + 7x(16) + 6x(17) + 5x(18) + 4x(19) + 3x(20) + 2x(21) + x(22)$ | $Y_2(15) + 8Y_1(15) + 8x(16) + 7x(17) + 6x(18) + 5x(19) + 4x(20) + 3x(21) + 2x(22) + x(23)$ |
| $Y_3$ | $Y_3(15) + 5Y_2(15) + 15Y_1(15) + 15x(16) + 10x(17) + 6x(18) + 3x(19) + x(20)$ | $Y_3(15) + 6Y_2(15) + 21Y_1(15) + 21x(16) + 15x(17) + 10x(18) + 6x(19) + 3x(20) + x(21)$ | $Y_3(15) + 7Y_2(15) + 28Y_1(15) + 28x(16) + 21x(17) + 15x(18) + 10x(19) + 6x(20) + 3x(21) + x(22)$ | $Y_3(15) + 8Y_2(15) + 36Y_1(15) + 36x(16) + 28x(17) + 21x(18) + 15x(19) + 10x(20) + 6x(21) + 3x(22) + x(23)$ |

| index | 24 | 25 | 26 | 27 |
|---|---|---|---|---|
| $Y_1$ | $Y_1(15) + x(16) + x(17) + x(18) + x(19) + x(20) + x(21) + x(22) + x(23) + x(24)$ | $Y_1(15) + x(16) + x(17) + x(18) + x(19) + x(20) + x(21) + x(22) + x(23) + x(24) + x(25)$ | $Y_1(15) + x(16) + x(17) + x(18) + x(19) + x(20) + x(21) + x(22) + x(23) + x(24) + x(25) + x(26)$ | $Y_1(15) + x(16) + x(17) + x(18) + x(19) + x(20) + x(21) + x(22) + x(23) + x(24) + x(25) + x(26) + x(27)$ |
| $Y_2$ | $Y_2(15) + 9Y_1(15) + 9x(16) + 8x(17) + 7x(18) + 6x(19) + 5x(20) + 4x(21) + 3x(22) + 2x(23) + x(24)$ | $Y_2(15) + 10Y_1(15) + 10x(16) + 9x(17) + 8x(18) + 7x(19) + 6x(20) + 5x(21) + 4x(22) + 3x(23) + 2x(24) + x(25)$ | $Y_2(15) + 11Y_1(15) + 11x(16) + 10x(17) + 9x(18) + 8x(19) + 7x(20) + 6x(21) + 5x(22) + 4x(23) + 3x(24) + 2x(25) + x(26)$ | $Y_2(15) + 12Y_1(15) + 12x(16) + 11x(17) + 10x(18) + 9x(19) + 8x(20) + 7x(21) + 6x(22) + 5x(23) + 4x(24) + 3x(25) + 2x(26) + x(27)$ |
| $Y_3$ | $Y_3(15) + 9Y_2(15) + 45Y_1(15) + 45x(16) + 36x(17) + 28x(18) + 21x(19) + 15x(20) + 10x(21) + 6x(22) + 3x(23) + x(24)$ | $Y_3(15) + 10Y_2(15) + 55Y_1(15) + 55x(16) + 45x(17) + 36x(18) + 28x(19) + 21x(20) + 15x(21) + 10x(22) + 6x(23) + 3x(24) + x(25)$ | $Y_3(15) + 11Y_2(15) + 66Y_1(15) + 66x(16) + 55x(17) + 45x(18) + 36x(19) + 28x(20) + 21x(21) + 15x(22) + 10x(23) + 6x(24) + 3x(25) + x(26)$ | $Y_3(15) + 12Y_2(15) + 78Y_1(15) + 78x(16) + 66x(17) + 55x(18) + 45x(19) + 36x(20) + 28x(21) + 21x(22) + 15x(23) + 10x(24) + 6x(25) + 3x(26) + x(27)$ |

| index | 28 | 29 | 30 | 31 |
|---|---|---|---|---|
| $Y_1$ | $Y_1(15) + x(16) + x(17) + x(18) + x(19) + x(20) + x(21) + x(22) + x(23) + x(24) + x(25) + x(26) + x(27) + x(28)$ | $Y_1(15) + x(16) + x(17) + x(18) + x(19) + x(20) + x(21) + x(22) + x(23) + x(24) + x(25) + x(26) + x(27) + x(28) + x(29)$ | $Y_1(15) + x(16) + x(17) + x(18) + x(19) + x(20) + x(21) + x(22) + x(23) + x(24) + x(25) + x(26) + x(27) + x(28) + x(29) + x(30)$ | $Y_1(15) + x(16) + x(17) + x(18) + x(19) + x(20) + x(21) + x(22) + x(23) + x(24) + x(25) + x(26) + x(27) + x(28) + x(29) + x(30) + x(31)$ |
| $Y_2$ | $Y_2(15) + 13Y_1(15) + 13x(16) + 12x(17) + 11x(18) + 10x(19) + 9x(20) + 8x(21) + 7x(22) + 6x(23) + 5x(24) + 4x(25) + 3x(26) + 2x(27) + x(28)$ | $Y_2(15) + 14Y_1(15) + 14x(16) + 13x(17) + 12x(18) + 11x(19) + 10x(20) + 9x(21) + 8x(22) + 7x(23) + 6x(24) + 5x(25) + 4x(26) + 3x(27) + 2x(28) + x(29)$ | $Y_2(15) + 15Y_1(15) + 15x(16) + 14x(17) + 13x(18) + 12x(19) + 11x(20) + 10x(21) + 9x(22) + 8x(23) + 7x(24) + 6x(25) + 5x(26) + 4x(27) + 3x(28) + 2x(29) + x(30)$ | $Y_2(15) + 16Y_1(15) + 16x(16) + 15x(17) + 14x(18) + 13x(19) + 12x(20) + 11x(21) + 10x(22) + 9x(23) + 8x(24) + 7x(25) + 6x(26) + 5x(27) + 4x(28) + 3x(29) + 2x(30) + x(31)$ |
| $Y_3$ | $Y_3(15) + 13Y_2(15) + 91Y_1(15) + 91x(16) + 78x(17) + 66x(18) + 55x(19) + 45x(20) + 36x(21) + 28x(22) + 21x(23) + 15x(24) + 10x(25) + 6x(26) + 3x(27) + x(28)$ | $Y_3(15) + 14Y_2(15) + 105Y_1(15) + 105x(16) + 91x(17) + 78x(18) + 66x(19) + 55x(20) + 45x(21) + 36x(22) + 28x(23) + 21x(24) + 15x(25) + 10x(26) + 6x(27) + 3x(28) + x(29)$ | $Y_3(15) + 15Y_2(15) + 120Y_1(15) + 120x(16) + 105x(17) + 91x(18) + 78x(19) + 66x(20) + 55x(21) + 45x(22) + 36x(23) + 28x(24) + 21x(25) + 15x(26) + 10x(27) + 6x(28) + 3x(29) + x(30)$ | $Y_3(15) + 16Y_2(15) + 136Y_1(15) + 136x(16) + 120x(17) + 105x(18) + 91x(19) + 78x(20) + 66x(21) + 55x(22) + 45x(23) + 36x(24) + 28x(25) + 21x(26) + 15x(27) + 10x(28) + 6x(29) + 3x(30) + x(31)$ |

Based on the equations in Table 1, the coefficient a, the coefficient b, and the plurality of c coefficients ($c_1$-$c_{16}$) corresponding to each of the sixteen elements of the particular subset may be determined. Each input element is associated with a different set of coefficients (e.g., different values of the coefficients a, b, and $c_1$-$c_{16}$). A particular set of coefficients corresponding to a particular element m may be generated based on the value of m and a number of elements in the particular subset of elements. For example, a first set of coefficients corresponding to m=3 may be generated based on the $Y_3(18)$ entry in Table 1, which indicates that a=3, b=3, $c_1$=6, $c_2$=3, and $c_3$=1. Although not expressly identified the $Y_3(18)$ entry in Table 1, coefficients $c_4$-$c_{16}$ are zero (e.g., elements X(19)-X(31) are not used to compute $Y_3(18)$). As another example, a second set of coefficients corresponding to m=5 may be generated based on the $Y_3(20)$ entry in Table 1, which indicates that a=5, b=15, $c_1$=15, $c_2$=10, $c_3$=6, $c_4$=3, $c_5$=1, and $c_6$-$c_{16}$ are zero. As illustrated by the two examples, the third-level integration operation is performed using a different set of coefficients a, b, and $c_1$-$c_{16}$ for each element m of the particular subset. Thus, sixteen sets of the coefficients a, b, and $c_1$-$c_{16}$ can be generated based on the entries $Y_3(16)$-$Y_3(31)$ in Table 1.

Performing the third level integration operation $Y_3$ on a particular element m includes multiplying each of the elements of the particular subset of elements X(16)-X(31) and the set of previous results $Y_1(15)$, $Y_2(15)$, and $Y_3(15)$ by a corresponding coefficient (the coefficients a, b, and $c_1$-$c_{16}$) of the set of coefficients corresponding to m. The resulting products are added together (e.g., summed) to generate the third-level integration result $Y_3(n+m)$ corresponding to element m.

Although Table 1 includes equations used for computing results associated with a particular subset of elements X(16)-X(31), the plurality of coefficients (the sixteen sets of the coefficients a, b, and $c_1$-$c_{16}$) generated based on Table 1 may be used to process each subset of elements. For example, elements of another subset (e.g., X(32)-X(47)) may be processed using the plurality of coefficients, the input elements X(32)-X(47), and a set of previous results that includes $Y_1(31)$, $Y_2(31)$, and $Y_3(31)$. For example, $Y_3(32)$ may be generated using the set of coefficients associated with $Y_3(16)$ and $Y_3(33)$ may be generated using the set of coefficients associated with $Y_3(17)$. $Y_3(34)$-$Y_3(47)$ may be similarly processed using sets of coefficients associated with $Y_3(18)$-$Y_3(31)$. As another example, elements of a subset X(0)-X(15) may be generated using the plurality of coefficients and the elements X(0)-X(15) and zero values for the set of previous results $Y_1(-1)$, $Y_2(-1)$, and $Y_3(-1)$. The multiplication operations may be performed by executing a single multi-vector multiplication instruction at a vector processor, as further described with reference to FIG. 4.

Table 1 also enables generation of coefficients associated with computing results of intermediate levels of integration. For example, coefficients associated with computing a first level integration result for the particular subset of elements may be generated based on the $Y_1(31)$ entry. As another example, coefficients associated with computing a second level integration result for the particular subset of elements may be generated based on the $Y_2(31)$ entry. The coefficients generated based on the $Y_1(31)$ and $Y_2(31)$ entries may be used to generate intermediate results associated with different subsets of elements (e.g., X(0)-X(15) or X(32)-X(47)).

During operation, each subset of elements may be processed by the multi-level integrator 202 using a set of previous results and a plurality of coefficients. Processing the subset of elements may generate a corresponding subset of results and a corresponding set of intermediate results. In a particular embodiment, the plurality of coefficients may be generated prior to performing the 3-level integration operation. For example, the plurality of coefficients may be computed based on a vector width of a vector processor (corresponding to the number of elements in each subset) and a number of levels of multi-level integration to be performed. The plurality of coefficients may be stored in a memory prior to performing multi-level integration. In a particular embodiment, the multi-level integrator 202 may be a vector processor, and the plurality of coefficients may be generated and stored in the memory coupled to the processor. The vector processor may fetch the plurality of coefficients from the memory and store the plurality of coefficients in registers for use in multi-level integration. In another embodiment, the plurality of coefficients may be generated and stored in the registers without being stored in main memory.

Performing the 3-level integration operation of FIG. 2 using the multi-level integrator 202 enables faster performance of multi-level integration as compared to conventional multi-level integrators. In a first embodiment, the 3-level integration operation is performed by a vector processor, such as a vector digital signal processor (DSP) configured to process 512-bit input vectors containing sixteen 32-bit data words and to process instruction packets containing two instructions. In this embodiment, the 3-level integration operation may be performed at a rate of 0.5 instruction packets per element (e.g., pixel), as compared to a rate of 1.5 instruction packets per element associated with performing conventional multi-level integration. This embodiment may reduce a number of instruction packets used to process each element by 67%. In another embodiment, the processor may be configured to process 256-bit input vectors containing eight 32-bit data words. In this embodiment, the 3-level integration operation may be performed at a rate of 0.75 instruction packets per element, which is a reduction of 50% as compared to conventional multi-level integration. Additionally, the multi-level integrator 202 reduces a number of operations performed by generating intermediate results at a down-sampled rate of 1/Δ, as opposed to generating an intermediate result for each input element. The multi-level integrator 202 also reduces the number of operations performed by generating the plurality of coefficients a single time before performing multi-level integration.

Figure 3:
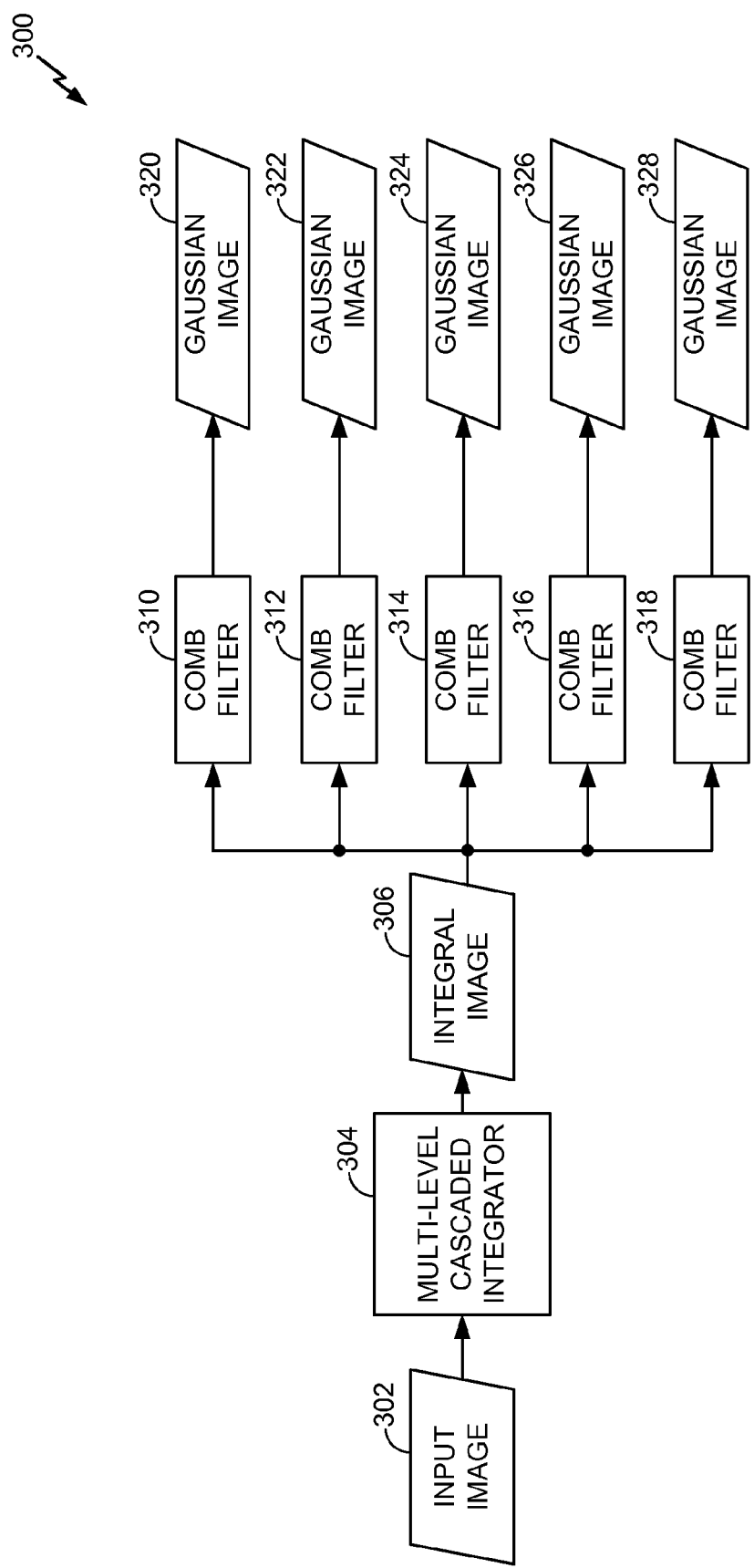
FIG. 3 is a diagram of a particular embodiment of a system configured to generate a plurality of Gaussian images based on an integral image.

Referring to FIG. 3, a particular embodiment of a system configured to generate a plurality of Gaussian images 320-328 based on an integral image 306 is depicted and generally designated 300. The system 300 may be configured to perform the 2-level integration operation of FIG. 1 or the 3-level integration operation of FIG. 2. The system 300 may be used in place of one or more conventional cascaded integrator comb filters for performing various forms of image processing.

The system 300 includes a multi-level integrator 304 and a plurality of comb filters 310-318, each of which may be implemented using hardware, software (e.g., instructions executable by a processor), or both. In an illustrative embodiment, the multi-level integrator 304 and the plurality of comb filters 310-318 are integrated into and/or executable at an electronic device, such as a desktop computer, a laptop computer, a tablet computer, a mobile phone, a smartphone, etc. The multi-level integrator 304 may be the multi-level integrator 102 of FIG. 1 or the multi-level integrator 202 of FIG. 2.

The multi-level integrator 304 may be configured to receive an input image 302 and to generate the integral image 306 based on the input image 302. The input image 302 may correspond to the input 108 of FIG. 1 or the input 210 of FIG. 2, and the integral image may correspond to the output 114 of FIG. 1 or the output 250 of FIG. 2. In a particular embodiment, the input image 302 may be a portion of a larger image, and the integral image 306 may be an integral image of the portion. For example, feature detection in image processing may identify a portion of an image for further processing. The portion of the image may be used to generate an integral image, using the multi-level integrator 304, for use in additional image processing operations.

In a particular embodiment, the multi-level integrator 304 may perform the 3-level integration operation of FIG. 2 on the input image 302. For example, the multi-level integrator 304 may perform a first-level integration operation and a second-level integration operation on a first subset of elements of the input image 302. Results of the second-level integration operation on the first subset of elements may be generated in parallel. The multi-level integrator 304 may be further configured to perform a second level integration operation on a second subset of elements of the input image 302 based on a first result of the first-level integration operation and a second result of the second-level integration operation performed on the first subset of elements. Additional operations may also be performed, as described with reference to FIG. 2.

Each of the plurality of comb filters 310-318 may be configured to receive the integral image 306 and to generate a corresponding Gaussian image of a plurality of Gaussian images 320-328. Each comb filter of the plurality of comb filters 310-318 is associated with a corresponding delay factor, and each comb filter generates a corresponding Gaussian image based on the corresponding delay factor. For example, a first comb filter 310 generates the first Gaussian image 320 based on the integral image 306 and a first delay factor associated with the first comb filter 310. As another example, a second comb filter 312 generates the second Gaussian image 322 based on the integral image 306 and a second delay factor associated with the second comb filter 312. Although FIG. 3 illustrates five comb filters 310-318 generating five Gaussian images 320-328, the illustration is not limiting. In other embodiments, the system 300 may include less than five or more than five comb filters each configured to generate a corresponding Gaussian image. In alternate embodiments, the system 300 may include a plurality of multi-level integrators, each configured to generate a corresponding integral image for processing by a corresponding comb filter.

The plurality of Gaussian images 320-328 may be used during various forms of image processing. The system 300 may include an image processor (not shown) configured to perform one or more types of image processing based on the plurality of Gaussian images 320-328. In a particular embodiment, the image processor may be configured to perform multi-scale image processing based on the plurality of Gaussian images 320-328. Each of the Gaussian images 320-328 may have a different scale factor based on the delay factor of a corresponding comb filter. A scale-space representation of the input image 302 may be constructed based on the plurality of Gaussian images 320-328. In another embodiment, the image processor may be configured to perform blurring image processing based on the plurality of Gaussian images 320-328. Each of the Gaussian images 320-328 may have a different level of blurring based on the delay factor of a corresponding comb filter.

The system 300 may provide advantages over conventional multi-level cascaded integrator comb filters. As explained with reference to FIGS. 1-2, the multi-level integrator 304 performs multi-level integration faster and using less processing resources (e.g., performing fewer computations and storing fewer intermediate results) than conventional multi-level cascaded integrator comb filters. Additionally, the system 300 generates the integral image 306 a single time, regardless of a number of comb filters that receive the integral image 306 as input. Generating the integral image 306 a single time may reduce a processing burden associated with generating the integral image 306, as compared to a plurality of cascaded integrator comb (CIC) filters that each generates an integral image before processing via a respective comb filter portion.

In a particular embodiment, the multi-level integrator 102, the multi-level integrator 202, or the multi-level integrator 304 may include a vector processor configured to perform multi-level integration operations. In order to efficiently perform calculations corresponding to Equations 1-5, one or more instructions may be added to an instruction set architecture (ISA). The one or more instructions may be vector processing instructions to take advantage of processing resources. For example, a multi-vector multiplication instruction (e.g., the multi-vector multiplication instruction 402 illustrated by FIG. 4) may be added to the ISA to enable efficient performance of multiplication operations used in Equation 5.

Figure 4:
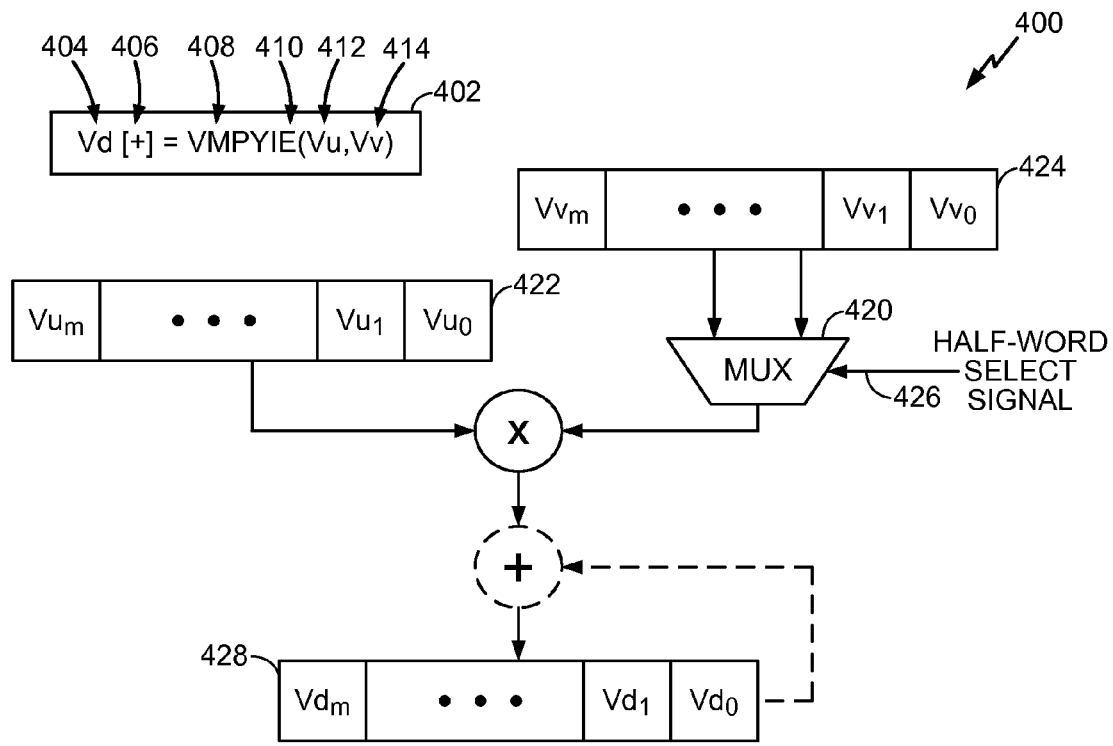
FIG. 4 illustrates a particular embodiment of executing a multi-vector multiplication instruction at a vector processor.

Referring to FIG. 4, a particular embodiment of executing a multi-vector multiplication instruction 402 at a vector processor is depicted and generally designated 400. The multi-vector multiplication instruction 402 may be received at the processor, such as a vectorized digital signal processor (DSP). For example, the multi-vector multiplication instruction 402 may be stored in memory and may be fetched by the processor during instruction processing. The processor may be configured to execute the multi-vector multiplication instruction 402 during performance of a multi-level integration operation, such as the 2-level integration operation performed by the multi-level integrator 102 of FIG. 1 or the 3-level integration operation performed by the multi-level integrator of FIG. 2, respectively.

As illustrated in FIG. 4, the multi-vector multiplication instruction 402 may include an instruction name 408 (e.g., an opcode), such as "VMPYIE." The multi-vector multiplication instruction 402 may also include a first field 412, a second field 414, and a third field 404. A first value (Vu) of the first field 412 may indicate a first (input) vector register 422 used during execution of the multi-vector multiplication instruction 402. A second value (Vv) of the second field 414 may indicate a second (input) vector register 424 used during execution of the multi-vector multiplication instruction 402. A third value (Vd) of the third field 404 may indicate a third (destination) vector register 428 used to store results of the multi-vector multiplication instruction 402. The multi-vector multiplication instruction 402 may further include an accumulation operator 406. The accumulation operator 406 is illustrated in FIG. 4 as a "+" in brackets because the accumulation operator 406 is optional. For example, the multi-vector multiplication instruction 402 may be expressed as Vd+=VMPYIE(Vu, Vv) when the accumulation operator 406 is included and as Vd=VMPYIE(Vu, Vv) when the accumulation operator 406 is not included. The accumulation operator 406 indicates performance of an additional accumulation function during execution of the multi-vector multiplication instruction 402, as further described herein.

Execution of the multi-vector multiplication instruction 402 may cause the processor to multiply each of a plurality of elements of the first vector register 422 by a corresponding element of the second vector register 424. The first vector register 422 may include elements $Vu_0$-$Vu_m$ and the second vector register 424 may include elements $Vv_0$-$Vv_m$. In a particular embodiment, each element of the first vector register 422 may contain a 32-bit data word and each element of the second vector register 424 may contain a pair of 16-bit data half-words. A half-word indicator 410 in the instruction name 408 may cause the processor to generate a half-word select signal 426. The half-word select signal 426 may be used by a multiplexer 420 to select one of the pair of 16-bit data half-words during execution of the multi-vector multiplication instruction 402. For example, when the half-word indicator 410 is a first value (e.g., the letter "E" in the instruction name "VMPYIE"), the half-word select signal 426 may cause a first 16-bit data half word to be selected. When the half-word indicator 410 is a second value (e.g., the letter "O" in the instruction name "VMPYIO"), the half-word select signal 426 may cause a second 16-bit data half word to be selected.

Execution of the multi-vector multiplication instruction 402 causes the processor to generate a first result by multiplying a first element in the first vector register 422 by a second element in the second vector register 424. For example, the processor may multiply element $Vu_0$ in the first vector register 422 by element $Vv_0$ (e.g., a particular half-word selected based on the half-word select signal 426). Execution of the multi-vector multiplication instruction 402 further causes the processor to generate a second result by multiplying a third element in the first vector register 422 by a fourth element in the second vector register 424. For example, the processor may multiply element $Vu_1$ in the first vector register 422 by element $Vv_1$. Other elements in the first vector register 422 (e.g., elements $Vu_2$-$Vu_m$) may be similarly multiplied by other elements in the second vector register 424 (e.g., element $Vv_2$-$Vv_m$).

When the accumulation operator 406 is not included in the multi-vector multiplication instruction 402, the first result may be stored as a first output element $Vd_0$ and the second result may be stored as a second output element $Vd_1$ in the third vector register 428. Other results may be similarly stored or accumulated in the third vector register 428 (e.g., as elements $Vd_2$-$Vd_m$). When the accumulation operator 406 is included in the multi-vector multiplication instruction 402, the first result may be added to an existing value of the first output element $Vd_0$ and the second result may be added to an existing value of the second output element $Vd_1$. Thus, when the accumulation operator 406 is not included, the third vector register 428 may be zeroed out prior to executing the multi-vector multiplication instruction 402. When the accumulation operator 406 is included, the third vector register 428 may be loaded with data values prior to executing the multi-vector multiplication instruction 402.

Using the multi-vector multiplication instruction 402 may increase speed and reduce memory requirements associated with a multi-level integration operation. For example, the first vector register 422 may store a subset of elements of an input of the multi-level integration operation, such as one of the subsets of elements 110 or 112 of FIG. 1 or the subsets 212-216 of FIG. 2, and the second vector register 424 may store a set of coefficients. Executing the multi-vector multiplication instruction 402 enables multiplication of the subset of elements by the set of coefficients using a single instruction. By using the multi-vector multiplication instruction 402 instead of multiple instructions to perform the multiplication operation, less memory and fewer processing cycles may be used. For example, the multi-vector multiplication instruction 402 (e.g., a single instruction) may be stored in memory instead of storing multiple multiplication instructions. As another example, executing the multi-vector multiplication instruction 402 may use fewer processing cycles than executing multiple multiplication instructions.

Figure 5:
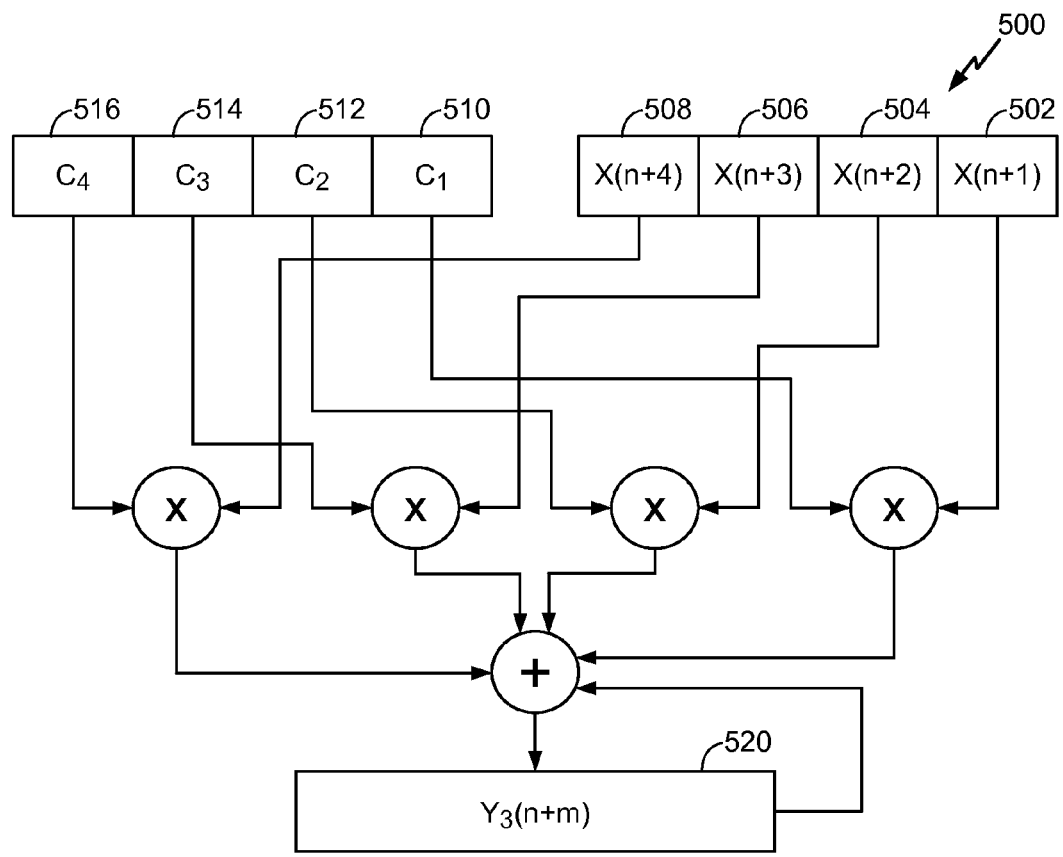
Figure 6:
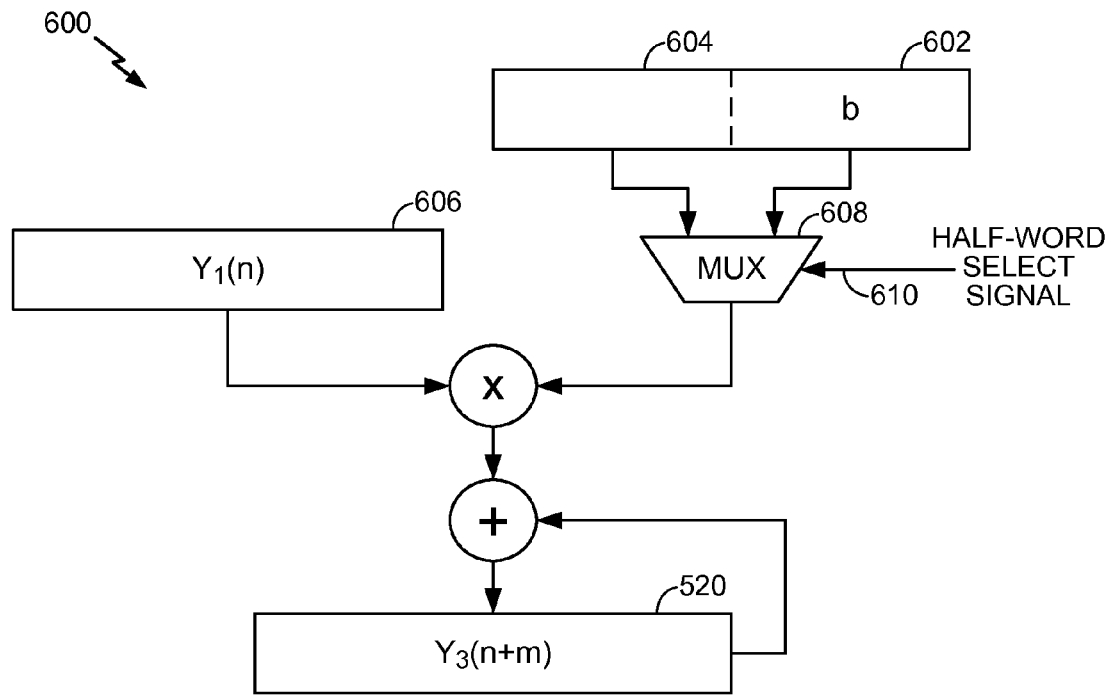
Figure 7:
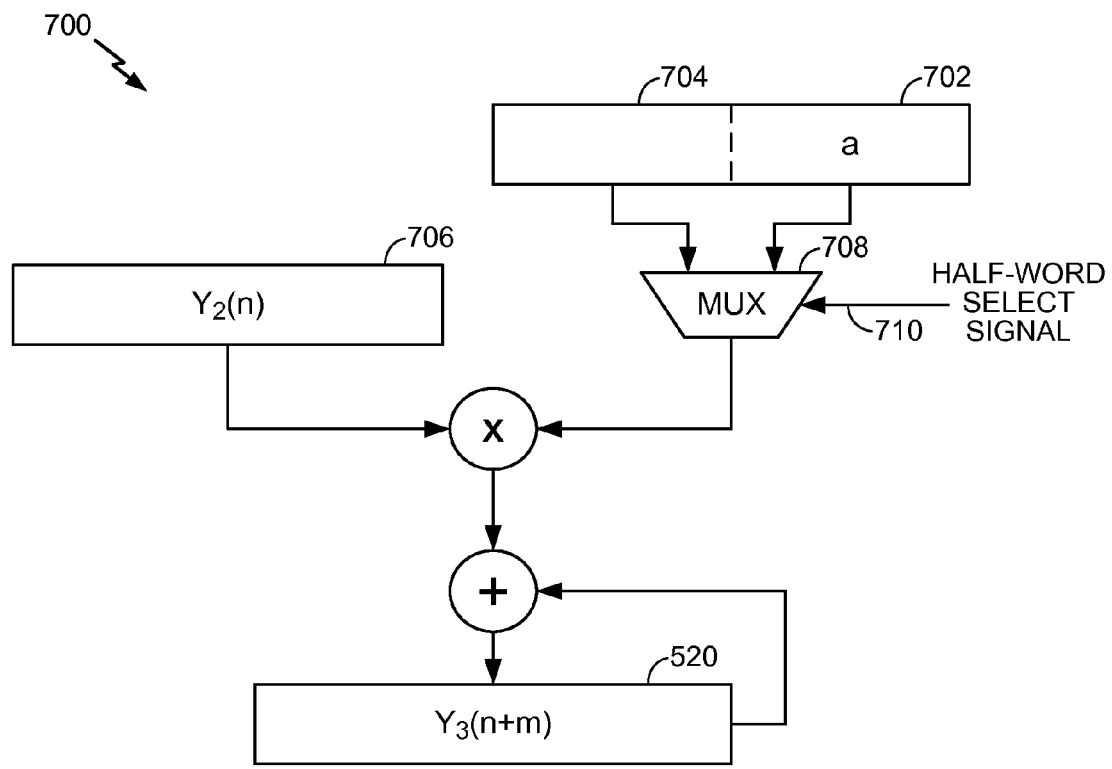
Figure 8:
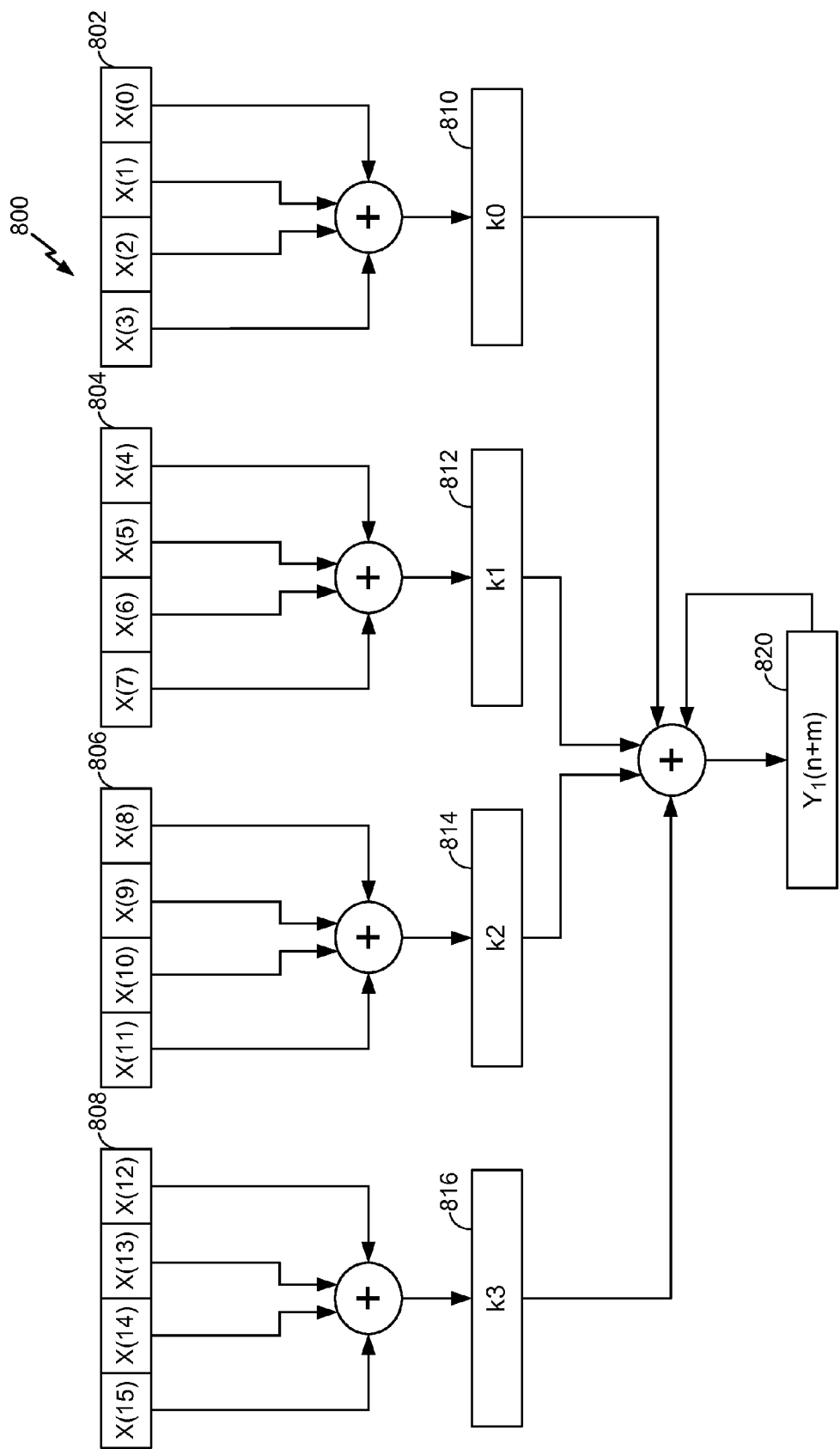

FIGS. 5-9 illustrate performing a multi-level integration at a vector processor. The multi-level integration may be performed by the multi-level integrator 202 of FIG. 2 or the multi-level integrator 304 of FIG. 3. In FIGS. 5-9, a multi-level integration operation includes three levels of integration. The operations are performed on an input (e.g., a plurality of elements) that is subdivided into sixteen element subsets. In FIGS. 5-9, elements of a particular subset are referred to as X(n+1)-X(n+16). However, the embodiment is not limited to any particular sixteen elements of the plurality of elements or any particular value of n. For example, the operations may be performed on elements X(0)-X(15), X(16)-X(31), X(32)-X(47), etc. Each of the vector registers depicted in FIGS. 5-9 includes multiple elements. FIGS. 5-7 illustrate generating $Y_3(n+m)$ based on Equation 5. Although illustrated as being performed in order of FIGS. 5-7, the steps of FIGS. 5-7 may be performed in any order. FIGS. 8-7 illustrate generation of $Y_1(n+16)$ and $Y_2(n+16)$, respectively, for a value of n=−1. N is associated with a last value of a previous subset, so a value of n=−1 indicates that there is not a previous subset. The operations depicted in FIGS. 8-9 may similarly be performed for other values of n using a corresponding subset of elements.

FIG. 5 illustrates a first step 500 of performing multi-level integration at the vector processor. In FIG. 5, a portion of Equation 5 represented as $Y_3(n+m)=c_4*X(n+4)+c_3*X(n+3)+c_2*X(n+2)+c_1*X(n+1)$ is illustrated.

Performing the multi-level integration operation includes multiplying each element X(n+4)-X(n+1) by a corresponding coefficient $c_4$-$c_1$ and generating a sum of the results. Coefficients $c_4$-$c_1$ may be stored in elements 510-516 of a first register. The coefficients $c_4$-$c_1$ may correspond to the value of m. For example, a first set of coefficients $c_4$-$c_1$ used to generate $Y_3(n+1)$ may be different than a second set of coefficients used to generate $Y_3(n+2)$. Input elements X(n+4)-X(n+1) may be stored in elements 502-508 of a second register. As illustrated in FIG. 5, each of the elements of the second register may be multiplied by a corresponding element of the first register. For example, element 502 (X(n+1)) may be multiplied by element 510 ($c_1$), element 504 (X(n+2)) may be multiplied by element 512 ($c_2$), element 506 (X(n+3)) may be multiplied by element 514 ($c_3$), and element 508 (X(n+4)) may be multiplied by element 516 ($c_4$). A sum of the results of the four multiplication operations may be generated and stored in an element 520 of a third register. The sum may be added to a previous value in the element 520 (e.g., the sum operation may include an accumulation operation). In a particular embodiment, an initial value in the element 520 is zero, and performing the first step 500 stores a sum of the four multiplication operations in the element 520.

The first step 500 may be repeated using other inputs to perform additional portions of Equation 5. For example the first step 500 may be repeated for $c_8$-$c_5$ and X(n+8)-X(n+5) $c_{12}$-$c_9$ and X(n+12)-X(n+9), and $c_{16}$-$c_{13}$ and X(n+16)-X(n+13), respectively. After performance of the first step 500 four times, the element 520 of the third register may store a value corresponding to:

$$Y_3(n+m)=\Sigma_{i=1}^{m} c_i*X(n+i) \qquad \text{Equation (6)}$$

The multiplication operations may be performed via execution of the multi-vector multiplication instruction 402 (e.g., a single instruction), as described with reference to FIG. 4. For example, the first register and the second register may be identified by the multi-vector multiplication instruction 402, and the resulting products may be stored in a target vector register before the sum is generated. Performing the multiplication operations using the multi-vector multiplication instruction 402 may increase performance as compared to performing each multiplication operation using a corresponding multiplication instruction. For example, storing the multi-vector multiplication instruction 402 uses less memory than storing multiple multiplication instructions, and the multi-vector multiplication instruction 402 is executed in less processing cycles than the multiple multiplication instructions.

Continuing to FIG. 6, a second step 600 of performing multi-level integration at the vector processor is depicted. In FIG. 6, the coefficient b is multiplied by $Y_1(n)$ and the resulting product is added to the result of FIG. 5. The coefficient b may be stored in a first half-word 602 or a second half-word 604 of a particular element of a first register. The half-word may be selected by a multiplexer 608 based on a half-word select signal 610. For example, an instruction executed during performance of the second step 600 may include a half-word indicator, and the processor may set the half-word select signal 610 based on the half-word indicator, as described with reference to the half-word select signal 426 of FIG. 4. The coefficient b may correspond to the value of m. For example, a first coefficient b used to generate $Y_3(n+1)$ may be different than a second coefficient b used to generate $Y_3(n+2)$.

$Y_1(n)$ may be stored in element 606 of a second register. $Y_1(n)$ may correspond to a first level integration result (e.g., an intermediate result) associated with a different (e.g., previous) subset of elements. For example, $Y_1(n)$ may be $Y_1(15)$ when a second subset of elements (e.g., X(16)-X(31)) is being processed. As another example, $Y_1(n)$ may be zero when a first subset of elements (e.g., X(0)-X(15)) is being processed (e.g., X(0) is a first sequential element). As illustrated in FIG. 6, $Y_1(n)$ may be multiplied by the coefficient b. A result of the multiplication operation may be added to a previous value in the element 520 (e.g., the results generated during one or more repetitions of the first step 500 of FIG. 5). After performance of the second step 600, the element 520 of the third register may store a value corresponding to:

$$Y_3(n+m)=b*Y_1(n)+\Sigma_{i=1}^{m}c_i*X(n+i) \quad \text{Equation (7)}$$

Advancing to FIG. 7, a third step 700 of performing multi-level integration at the vector processor is depicted. In FIG. 7, the coefficient a is multiplied by $Y_2(n)$ and the resulting product is added to the result of FIG. 6. The coefficient a may be stored in a first half-word 702 or a second half-word 704 of a particular element of a first register. The half-word may be selected by a multiplexer 708 based on a half-word select signal 710. For example, an instruction executed during performance of the third step 700 may include a half-word indicator, and the processor may set the half-word select signal 710 based on the half-word indicator. The coefficient a may correspond to the value of m. For example, a first coefficient a used to generate $Y_3(n+1)$ may be different than a second coefficient a used to generate $Y_3(n+2)$.)

$Y_2(n)$ may be stored in element 706 of a second register. $Y_2(n)$ may correspond to a second level integration result (e.g., an intermediate result) associated with a different (e.g., previous) subset of elements. For example, $Y_2(n)$ may be $Y_2(15)$ when a second subset of elements (e.g., X(16)-X(31)) is being processed. As another example, $Y_2(n)$ may be zero when a first subset of elements (e.g., X(0)-X(15)) is being processed. As illustrated in FIG. 7, $Y_2(n)$ may be multiplied by the coefficient a. A result of the multiplication operation may be added to the previous value in the element 520 (e.g., the result generated during the second step 600 of FIG. 6). After performance of the third step 700, the element 520 of the third register may store a value corresponding to:

$$Y_3(n+m)=a*Y_2(n)+b*Y_1(n)+\Sigma_{i=1}^{m}c_1*X(n+i) \quad \text{Equation (8)}$$

In a particular embodiment, an additional operation (not shown) may be performed to add $Y_3(n)$ to the value in the element 520 of the third register. Adding $Y_3(n)$ to the value of $Y_3(n+m)$ generated by Equation (8) generates the value of $Y_3(n+m)$ from Equation 5.

Proceeding to FIG. 8, a fourth step 800 of performing multi-level integration at the vector processor is depicted. $Y_1(n+16)$ may be generated for use as an intermediate result in processing a different (e.g., next) subset of elements. FIG. 8 illustrates generating $Y_1(15)$ for a first subset of elements X(0)-X(15). In this example, n has a value of −1 to indicate there is no previous subset of elements. However, $Y_1(n+16)$ may be similarly generated for any value of n using a corresponding subset of elements. $Y_1(15)$ is generated by summing each element of the particular subset of elements X(0)-X(15) and adding the result to $Y_1(n)$. FIG. 8 illustrates summing each group of four elements 802-808 of the particular subset. The elements X(0)-X(15) may be stored in a first register (e.g., as a single vector), or may be stored in multiple registers based on processor resources or implementation. Although processing elements as groups of four elements is described, any number of groups of any number of elements may be processed based on processor resources.

A corresponding sum for each group of four elements 802-808 may be generated and stored in a corresponding register. For example, a sum of a first group of four elements 802 (X(3)-X(0)) may be generated and stored as k0 in a register 810. Sums for groups 804-808 (e.g., X(7)-X(4), X(11)-X(8), and X(15)-X(12)) may be generated and stored as k1-k3 in registers 812-816, respectively.

$Y_1(15)$ may be generated by adding each of k0-k3 to an initial value in an element 820 of a target register. For example, the element 820 may initially store a value of $Y_1(n)$. By adding elements k0-k3 and $Y_1(n)$, $Y_1(15)$ may be generated. The value of $Y_1(n)$ may be zero when $Y_1(15)$ is generated and may be non-zero when $Y_1(n+16)$ is generated. The value of $Y_1(15)$ may be stored at the element 820 of a target (e.g., destination) register, so that $Y_1(15)$ may be used during processing of a next subset of elements. In a particular embodiment, the value of $Y_1(15)$ may overwrite the value of $Y_1(n)$, as illustrated in FIG. 8. In other embodiments, the value of $Y_1(n)$ may be stored in a different register so that the value of $Y_1(15)$ stored in the element 820 of the target register does not overwrite the value of $Y_1(n)$.

Figure 9:
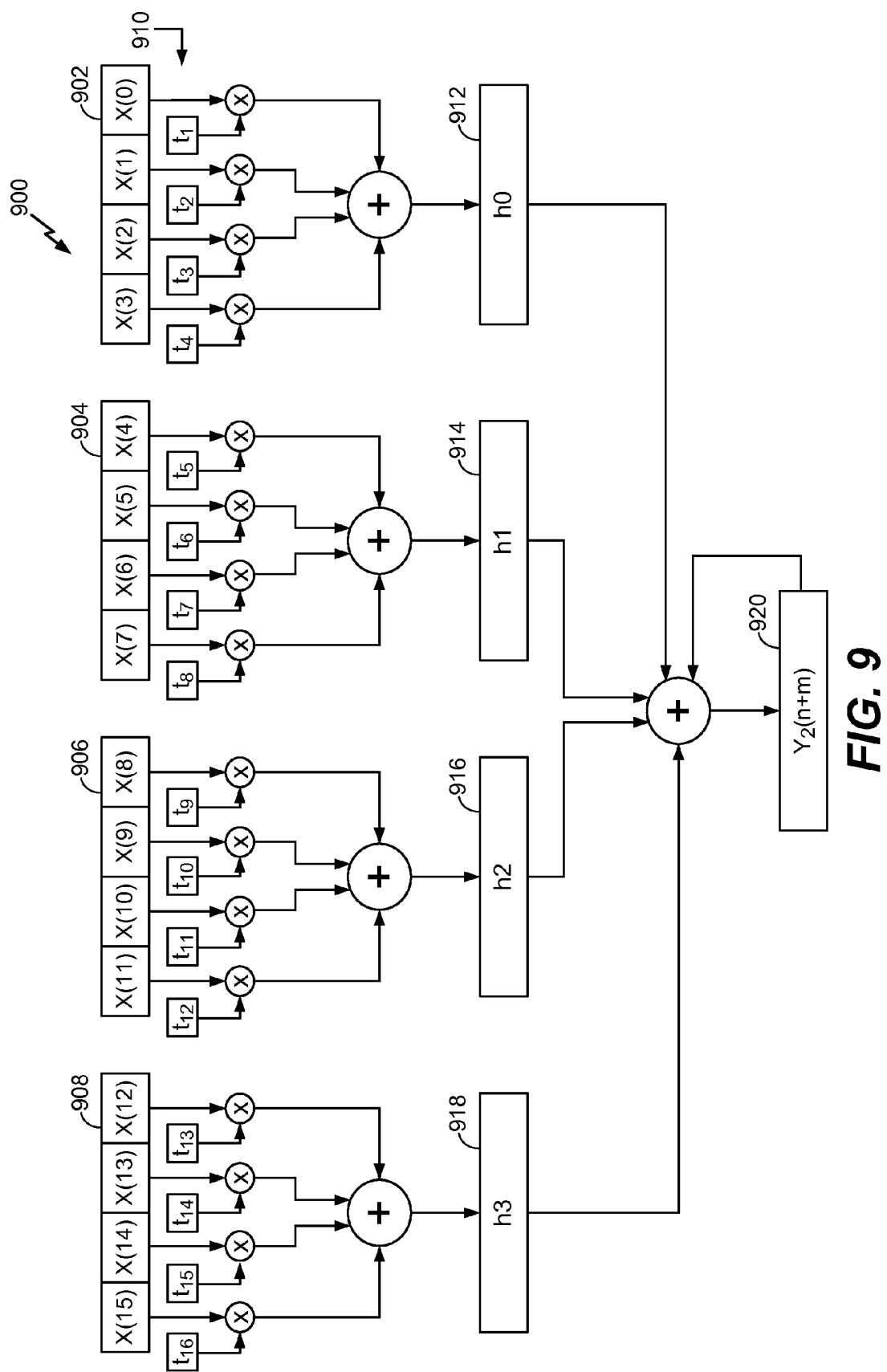

Advancing to FIG. 9, a fifth step 900 of performing multi-level integration at the vector processor is depicted. $Y_2(n+16)$ may be generated for use as an intermediate result in processing a different (e.g., next) subset of elements. FIG. 9 illustrates generating $Y_2(15)$ for a first subset of elements X(0)-X(15). However, $Y_2(n+16)$ may be similarly generated for any value of n using a corresponding subset of elements. $Y_2(15)$ is generated similarly to $Y_1(15)$ in FIG. 8 while including an additional step of multiplying each element of the particular subset of elements by a corresponding coefficient "t" of a plurality of coefficients 910 before generating the partial results (e.g., the sums of each group of four elements). The plurality of coefficients 910 (e.g., $t_1$-$t_{16}$) may be generated, stored, and/or retrieved in a similar manner as the plurality of coefficients $c_1$-$c_{16}$ (as described with reference to FIG. 2), based on the $Y_2(31)$ entry of Table 1.

Performing the fifth step 900 includes multiplying each element in a particular subset of elements (e.g., X(0)-X(15)) by a corresponding coefficient $t_1$-$t_{16}$ and adding results of the multiplication operations to $Y_2(n)$. When generating $Y_2(15)$, the value in $Y_2(n)$ is zero. When generating $Y_2(n+16)$, the value $Y_2(n)$ may be non-zero. In FIG. 9, the particular subset of elements is processed as groups 902-908 of four elements. The elements X(0)-X(15) may be stored in a first register (e.g., as a single vector) or may be stored in multiple registers based on processor resources or implementation. In other embodiments, groups having sizes less than or greater than four elements may be processed.

In FIG. 9, each of X(0)-X(3) of a first group of four elements 902 may be multiplied by a corresponding coefficient $t_1$-$t_4$, and a sum representing $t_1*X(0)+t_2*X(1)+t_3*X(2)+t_4*X(3)$ may be generated and stored as h0 in a second register 912. X(7)-X(4), X(11)-X(8), and X(15)-X(12) may be multiplied by $t_8$-$t_5$, $t_{12}$-$i_9$, and $t_{16}$-$i_{13}$, respectively, and corresponding sums may be generated and stored as h1-h3 in registers 914-918, respectively.

$Y_2(15)$ may be generated by adding each of h0-h3 to an initial value in a particular element 920 of a target register. For example, the particular element 920 may initially store a value of $Y_2(n)$. By adding elements h0-h3 and $Y_2(n)$, $Y_2(15)$ may be generated. The value of $Y_2(15)$ may be stored at the particular element 920 of the target register, so that $Y_2(15)$ may be used during processing of a next subset of elements. In a particular embodiment, the value of $Y_2(15)$ may overwrite the value of $Y_2(n)$, as illustrated in FIG. 9. In other embodiments, the value of $Y_2(n)$ may be stored in a different register so that the value of $Y_2(15)$ stored in the particular element 920 of the target register does not overwrite the value of $Y_2(n)$.

Thus, by performing operations illustrated in FIGS. 5-9, including iteratively executing the multi-vector multiplication instruction 402 of FIG. 4, a multi-level integrator may perform multi-level integration with increased speed and a reduced number of operations using vectorized processing. In a particular embodiment, performing the operations illustrated in FIGS. 5-9 may enable a vector processor to perform a 3-level integration operation. In an alternate embodiment, a multi-level integration operation may include more than three levels of integration, as may be used to process a high definition image. In this embodiment, the multi-level integrator may be configured to perform more than three levels of integration by iteratively performing the 3-level integration operation on an output of a previous iteration. For example, the multi-level integrator may be configured to generate a first output by performing the 3-level integration operation on an input image (or a portion thereof). The multi-level integrator may be further configured to generate a second output by performing the 3-level integration operation on the first output. The second output may correspond to an output of a 6-level integration operation performed on the input image. Thus, the multi-level integrator may perform additional levels of integration without an increase to the complexity of the multi-level integrator. In an alternate embodiment, the multi-level integrator may include an integrator corresponding to each level of the multi-level integration.

Referring to FIG. 10, a flow chart of a particular embodiment of a method 1000 of performing a multi-level integration operation is depicted. The multi-level integration operation may be performed on a plurality of elements (e.g., an input image that includes a plurality of pixels). For example, the multi-level integration operation may be the 2-level integration operation performed by the multi-level integrator 102 on the input 108 of FIG. 1, or the 3-level integration operation performed by the multi-level integrator 202 on the input 210 of FIG. 2. The multi-level integration operation may include a first level of integration and a second level of integration. In a particular embodiment, the multi-level integration operation includes two levels of integration. In other embodiments, the multi-level integration operation includes more than two levels of integration.

A first result of a first integration operation performed on a first subset of elements of the plurality of elements may be generated, at 1002. The first integration operation may be associated with the first level of integration. For example, the first result may be the first result 116 of FIG. 1 or the first result 220 of FIG. 2, and the first subset of elements may be the first subset of elements 110 ($i_0$-$i_2$) of FIG. 1 or the first subset of elements 212 ($i_0$-$i_7$) of FIG. 2. A second result of a second integration operation performed on the first subset of elements may be generated, at 1004. The second integration operation may be associated with the second level of integration. For example, the second result may be the second result 118 of FIG. 1 or the second result 224 of FIG. 2.

A third integration operation may be performed on a second subset of elements of the plurality of elements, at 1006. The third integration operation may be associated with a second level of integration. For example, the second subset of elements may be the second subset of elements 112 ($i_3$-$i_5$) of FIG. 1 or the second subset of elements 214 ($i_8$-$i_{13}$) of FIG. 2.

The third integration operation may be performed based on the first result and the second result.

Additional subsets of elements may be similarly processed. For example, a third result may be generated by performing a fourth integration operation (associated with the first level of integration) on the second subset of elements, and a fifth integration operation (associated with the second level of integration) may be performed on a third subset of elements based on the third result and a fourth result of the third integration operation. For example, the third result may be the fourth result 222 of the first level integrator(s) 204 of FIG. 2, and the fifth integration operation may be performed by the second level integrator(s) 206 on the third subset of elements 216 of FIG. 2. Accordingly, subsets of elements may be processed using a single intermediate result (e.g., a single first-level result, such as the first result or the third result) for each level of integration of a previous subset of elements.

In a particular embodiment where the multi-level integration operation includes only two levels of integration, the second integration operation may generate a first subset of results and the third integration operation may generate a second subset of results. For example, the subset of results may be the results $o_0$-$o_2$ of the output 114 and the second subset of results may be the results $o_3$-$o_5$ of the output 114 of FIG. 1. In this embodiment, an output of the multi-level integration operation may include the first subset of results and the second subset of results. The output may be an integral image (or a portion thereof) generated based on an input image (or a portion thereof). Each result of the first subset of results may be generated in parallel (e.g., concurrently), and each result of the second subset of results may be generated in parallel.

Referring to FIG. 11, a flow chart of a particular embodiment of a method 1100 of executing a multi-vector multiplication instruction is depicted. The multi-vector multiplication instruction may be the multi-vector multiplication instruction 402 of FIG. 4. The multi-vector multiplication instruction may be received at a processor, at 1102. The multi-vector multiplication instruction may indicate a first register and a second register. The first register may be the first (input) vector register 422 and the second register may be the second (input) vector register 424 of FIG. 4.

The multi-vector multiplication instruction may be executed via the processor, at 1104. For example, the processor may execute the multi-vector multiplication instruction during performance of a multi-level integration operation. The multi-level integration operation may include the 2-level integration operation performed by the multi-level integrator 102 of FIG. 1 or the 3-level integration operation performed by the multi-level integrator 202 of FIG. 2. The multi-vector multiplication instruction may be used to perform multiplication elements of an input (e.g., an input image or a portion thereof) by a set of coefficients, as described in FIGS. 5-9.

Executing the multi-vector multiplication instruction may include generating a first result by multiplying a first element in the first register by a second element in the second register and generating a second result by multiplying a third element in the first register by a fourth element in the second register. For example, a first element $X(n+1)$ may be multiplied by a first coefficient $c_1$ and a second element $X(n+2)$ may be multiplied by a second coefficient $c_2$, as illustrated in FIG. 5. Each of the second element and the fourth element may be selected from a corresponding pair of half-words in the second register based on a half-word indicator included in the multi-vector instruction. For example, the second element and the fourth element may be selected by the multiplexer 420 based on the half-word select signal 426 and the half-word indicator 410, as described with reference to FIG. 4. The first result may be stored in a third register or accumulated with a previous value stored in the third register prior to execution of the multi-vector multiplication instruction. For example, the first result may be stored or accumulated based on the accumulation operator 406, as described with reference to FIG. 4.

Referring to FIG. 12, a block diagram of a particular illustrative embodiment of a device (e.g., a wireless communication device) including a multi-level integrator 1250 is depicted and generally designated 1200. The multi-level integrator 1250 may include the multi-level integrator 102 of FIG. 1, the multi-level integrator 202 of FIG. 2, or the multi-level integrator 304 of FIG. 3, as illustrative examples. The device 1200 includes a processor 1210, such as a digital signal processor (DSP), coupled to a memory 1232. In a particular embodiment, the processor 1210 is an interleaved multi-threaded DSP.

The processor 1210 may be configured to execute computer-executable instructions (e.g., a program of one or more instructions) stored in the memory 1232 (e.g., a computer-readable storage medium). The memory 1232 may include a multi-vector multiplication instruction 1252. The multi-vector multiplication instruction 1252 may be the multi-vector multiplication instruction 402 of FIG. 4. In a particular embodiment, the memory 1232 may include application code executable to perform image processing including multi-level integration. The application code may include multiple vector instructions, including one or more multi-vector multiplication instructions 1252 used to generate an integral image based on an input image (or a portion thereof). As described with reference to FIG. 9, multiple levels of integration may be performed using accumulation, including executing the multiple multi-vector multiplication instructions on a single target vector register.

FIG. 12 also illustrates that a display controller 1226 may be coupled to the processor 1210 and to a display 1228. A coder/decoder (CODEC) 1234 may be coupled to the processor 1210. A speaker 1236 and a microphone 1238 may be coupled to the CODEC 1234. FIG. 12 further shows a camera controller 1260 coupled to the processor 1210. A camera 1262 may be coupled to the camera controller 1260. The camera 1262 may capture images, such as the input 108 of FIG. 1, the input 210 of FIG. 2, or the input image 302 of FIG. 3, as illustrative examples. FIG. 12 also illustrates that a wireless interface 1240, such as a wireless controller, may be coupled to the processor 1210 and to an antenna 1242, such that wireless data received via the antenna 1242 and the wireless interface 1240 may be provided to the processor 1210.

In a particular embodiment, the processor 1210 may be configured to execute the computer executable instructions stored at a non-transitory computer-readable medium, such as the memory 1232, to generate a first result of a first integration operation performed on a first subset of elements of a plurality of elements. The first integration operation may be included in a multi-level integration operation performed on the plurality of elements. The multi-level integration operation may include a first level of integration and a second level of integration. The first integration operation may be associated with the first level of integration. The computer executable instructions may be further executable by the processor 1210 to generate a second result of a second integration operation performed on the first subset of elements. The second integration operation may be associated with the second level of integration. Performing the second integration operation may generate a first plurality of results in parallel. The first plurality of results may include the second result. The computer executable instructions may be further executable by the processor 1210 to perform a third integration operation on a second subset of elements of the plurality of elements. The third integration operation may be associated with the second level of integration. The third integration operation may be performed based on the first result and the second result. Performing the third integration operation may generate a second plurality of results in parallel.

In a particular embodiment, the processor 1210, the display controller 1226, the memory 1232, the CODEC 1234, the camera controller 1260, and the wireless interface 1240 are included in a system-in-package or system-on-chip device 1222. An input device 1230 and a power supply 1244 may be coupled to the system-on-chip device 1222. Moreover, in a particular embodiment, as illustrated in FIG. 12, the display 1228, the input device 1230, the speaker 1236, the microphone 1238, the antenna 1242, the power supply 1244, and the camera 1262 are external to the system-on-chip device 1222. However, each of the display 1228, the input device 1230, the speaker 1236, the microphone 1238, the antenna 1242, the power supply 1244, and the camera 1262 may be coupled to a component of the system-on-chip device 1222, such as an interface or a controller.

The methods 1000 and 1100 of FIGS. 10 and 11 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the methods 1000 and 1100 of FIGS. 10 and 11, respectively, may be performed by one or more processors, such as the processor 1210, that execute instructions stored at the memory 1232, as described with respect to FIG. 12.

In conjunction with one or more of the described embodiments of FIGS. 1-12, an apparatus is disclosed that may include means for generating a first result of a first integration operation performed on a first subset of elements of a plurality of elements. The means for generating the first result may correspond to the first level integrator 104 of FIG. 1, the first level integrator(s) 204 of FIG. 2, the multi-level integrator 304 of FIG. 3, the multi-level integrator 1250 of FIG. 12, one or more other devices or structures configured to generate the first result of the first integration operation, or any combination thereof. The first integration operation may be included in a multi-level integration operation performed on the plurality of elements. The multi-level integration operation may include a first level of integration and a second level of integration. The first integration operation may be associated with the first level of integration.

The apparatus may include means for generating a second result of a second integration operation performed on the first subset of elements. The means for generating the second result may correspond to the second level integrator 106 of FIG. 1, the second level integrator(s) 206 of FIG. 2, the multi-level integrator 304 of FIG. 3, the multi-level integrator 1250 of FIG. 12, one or more other devices or structures configured to generate the second result of the second integration operation, or any combination thereof. The second integration operation may be associated with the second level of integration. Performing the second integration operation may generate a first subset of results in parallel. The first subset of results may include the second result.

The apparatus may include means for performing a third integration operation on a second subset of elements of the plurality of elements. The means for performing the third integration operation may correspond to the second level integrator 106 of FIG. 1, the second level integrator(s) 206 of FIG. 2, the multi-level integrator 304 of FIG. 3, the multi-level integrator 1250 of FIG. 12, one or more other devices or structures configured to perform the third integration operation, or any combination thereof. The third integration operation may be associated with the second level of integration. The third integration operation may be performed based on the first result and the second result. Performing the third integration operation may generate a second subset of results in parallel.

In conjunction with one or more of the described embodiments of FIGS. 1-12, an apparatus is disclosed that may include means for executing a multi-vector multiplication instruction. The means for executing the multi-vector multiplication instruction may correspond to the multi-level integrator 102 of FIG. 1, the multi-level integrator 202 of FIG. 2, the multi-level integrator 304 of FIG. 3, the multi-level integrator 1250 included in the processor 1210 of FIG. 12, one or more other devices or structures configured to execute the multi-vector multiplication operation, or any combination thereof. The multi-vector multiplication operation may indicate a first register and a second register. During execution of the multi-vector multiplication instruction, the means for executing the multi-vector multiplication instruction may generate a first result by multiplying a first element in the first register by a second element in the second register. During execution of the multi-vector multiplication instruction, the means for executing the multi-vector multiplication instruction may also generate a second result by multiplying a third element in the first register by a fourth element in the second register.

One or more of the disclosed embodiments may be implemented in a system or an apparatus, such as the device 1200, that may include a communications device, a fixed location data unit, a mobile location data unit, a mobile phone, a cellular phone, a satellite phone, a computer, a tablet, a portable computer, or a desktop computer. Additionally, the device 1200 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Although one or more of FIGS. 1-12 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   performing, at a processor, a multi-level integration operation on a plurality of elements, wherein the multi-level integration operation includes a first level of integration and a second level of integration, and wherein performing the multi-level integration operation comprises:
   generating a first result of a first integration operation performed on a first subset of elements of the plurality of elements, wherein the first integration operation is associated with the first level of integration;
   generating a second result of a second integration operation performed on the first subset of elements, wherein the second integration operation is associated with the second level of integration; and
   performing a third integration operation on a second subset of elements of the plurality of elements, wherein the third integration operation is associated with the second level of integration, and wherein the third integration operation is performed based on the first result and the second result.

2. The method of claim 1, wherein performing the second integration operation generates a first plurality of results in parallel, the first plurality of results including the second result.

3. The method of claim 2, wherein performing the third integration operation generates a second plurality of results in parallel, and wherein an output of the multi-level integration operation includes the first plurality of results and the second plurality of results.

4. The method of claim 1, wherein performing the multi-level integration operation further comprises:
  generating a third result of a fourth integration operation performed on the second subset of elements, wherein the fourth integration operation is associated with the first level of integration, and wherein performing the third integration operation generates a fourth result; and
  performing a fifth integration operation on a third subset of elements of the plurality of elements, wherein the fifth integration operation is associated with the second level of integration, and wherein the fifth integration operation is performed based on the third result and the fourth result.

5. The method of claim 1, wherein the multi-level integration operation includes a third level of integration, and wherein performing the multi-level integration operation further comprises:
  generating a first plurality of results of the multi-level integration operation based on a fourth integration operation performed on the first subset of elements, wherein the fourth integration operation is associated with the third level of integration, and wherein the first plurality of results includes a third result; and
  generating a second plurality of results of the multi-level integration operation based on a fifth integration operation performed on the second subset of elements, wherein the fifth integration operation is associated with the third level of integration, and wherein the fifth integration operation is performed based on the first result, the second result, and the third result.

6. The method of claim 1, further comprising:
  receiving, at the processor from a memory coupled to the processor, a plurality of coefficients associated with the multi-level integration operation, wherein each subset of elements has a particular number of elements, wherein the plurality of coefficients is determined based on the particular number of elements and a number of levels of integration of the multi-level integration operation, and wherein the plurality of coefficients is stored in the memory prior to performing the multi-level integration operation.

7. The method of claim 6, wherein performing the third integration operation generates a third result, and wherein the third result comprises a sum of multiplication results associated with multiplying each of the first result, the second result, and each element of the second subset of elements by a corresponding coefficient of the plurality of coefficients.

8. The method of claim 6, wherein each subset of elements of the plurality of elements is processed using the plurality of coefficients.

9. The method of claim 6, wherein performing the second integration operation comprises executing a multi-vector multiplication instruction at the processor, wherein the multi-vector multiplication instruction identifies a first register associated with the first subset of elements and a second register associated with a first set of the plurality of coefficients.

10. An apparatus comprising:
  a multi-level integrator configured to generate an integral image based on an input image, wherein the multi-level integrator is configured to perform a first level of integration and a second level of integration, and wherein generating the integral image comprises:
    performing a first integration operation on a first subset of pixels of the input image, wherein the first integration operation is associated with the second level of integration, and wherein the first integration operation is performed based on a first result of a second integration operation and a second result of a third integration operation; and
  a plurality of comb filters coupled to the multi-level integrator, wherein the plurality of comb filters is configured to output a plurality of Gaussian images based on the integral image.

11. The apparatus of claim 10, wherein generating the integral image further comprises:
  generating the first result based on the second integration operation performed on a second subset of pixels of the input image, wherein the second integration operation is associated with the first level of integration; and
  generating the second result based on the third integration operation performed on the second subset of pixels, wherein the third integration operation is associated with the second level of integration, and wherein the first result and the second result are generated prior to performing the first integration operation.

12. The apparatus of claim 10, wherein the first integration operation generates a first plurality of results in parallel, wherein the third integration operation generates a second plurality of results in parallel, wherein the multi-level integrator is configured to process each subset of pixels of the input image as a corresponding vector, and wherein each comb filter of the plurality of comb filters receives the integral image generated by the single multi-level integrator.

13. The apparatus of claim 10, further comprising an image processor configured to perform multi-scale image processing based on the plurality of Gaussian images by constructing a scale-space representation of the input image based on the plurality of Gaussian images.

14. The apparatus of claim 10, further comprising an image processor configured to perform blurring image processing based on the plurality of Gaussian images.

15. A method comprising:
  receiving a multi-vector multiplication instruction at a processor, wherein the multi-vector multiplication instruction identifies a first register and a second register; and
  executing, via the processor, the multi-vector multiplication instruction, wherein executing the multi-vector multiplication instruction causes the processor to:
    generate a first result by multiplying a first element in the first register by a first coefficient in the second register; and
    generate a second result by multiplying a second element in the first register by a second coefficient in the second register.

16. The method of claim 15, wherein execution of the multi-vector multiplication instruction is performed during multi-level integration of an input comprising a plurality of elements, wherein the first register stores a subset of elements of the plurality of elements, and wherein the second register stores a set of coefficients used to process the subset of elements.

17. The method of claim 15, wherein executing the multi-vector multiplication instruction further causes the processor to store the first result as a first output element in a target register indicated by the multi-vector multiplication instruction.

18. The method of claim 17, wherein executing the multi-vector multiplication instruction further causes the processor to store the second result as a second output element in the target register when the multi-vector multiplication instruction does not include an accumulation operator.

19. The method of claim 17, wherein executing the multi-vector multiplication instruction further causes the processor to store a sum of the first result and the second result as a second output element in the target register when the multi-vector multiplication instruction includes an accumulation operator.

20. The method of claim 15, wherein executing the multi-vector multiplication instruction further causes the processor to select the second element from a pair of sixteen bit half-words stored in the second register based on a half-word indicator included in the multi-vector multiplication instruction.

* * * * *